INVENTORS.
LARRY A. GOSHORN
SHERRIL A. HARMON
BY
ATTORNEY

| DECIMAL NUMBER | EQUIVALENT BINARY NUMBER |
|---|---|
| 0 | 000 |
| 1 | 001 |
| 2 | 010 |
| 3 | 011 |
| 4 | 100 |
| 5 | 101 |
| 6 | 110 |
| 7 | 111 |

FIG. 2

| BIT POSITION | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| BINARY NUMBER | 0 | 1 | 0 | 1 | 1 | 1 | 0 | 0 | 1 | 1 | 1 | 0 | 1 | 0 | 1 | 1 | 0 | 0 | 0 | 1 | 1 | 0 | 0 | 0 |
| EQUIVALENT OCTAL NUMBER | 2 | | | 7 | | | 1 | | | 6 | | | 5 | | | 4 | | | 3 | | | 0 | | |

FIG. 3

| COMMAND TYPE | OPERATION CODE 23 22 21 | 20 19 18 | INDEX BITS 17 16 15 | 14 | 13 12 11 10 9 8 7 6 5 4 3 2 1 0 |
|---|---|---|---|---|---|
| FULL OPERAND | | | | * | OPERAND ADDRESS |
| GEN 1 | 0 | 5 | | MICROCODED | |
| GEN 2 | 2 | 5 | | MICROCODED | |
| GEN 3 | 4 | 5 | | MICROCODED | |
| QUASI | 7 | 0-7 | | * | OPERAND ADDRESS |
| STEP FLOATING POINT | 0 | 1 | | MICROCODED | |

* RELATIVE ADDRESSING BIT

FIG. 4

Oct. 14, 1969 L. A. GOSHORN ET AL 3,473,161
CIRCULAR LISTING
Filed Nov. 23, 1966 22 Sheets-Sheet 4

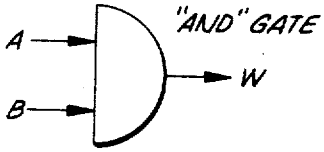
FIG. 8a
"AND" GATE TRUTH TABLE
| A | B | W |
|---|---|---|
| 0 | 0 | 0 |
| 1 | 0 | 0 |
| 0 | 1 | 0 |
| 1 | 1 | 1 |
FIG. 8b
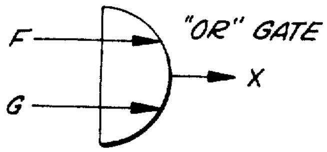
FIG. 9a
"OR" GATE TRUTH TABLE
| F | G | X |
|---|---|---|
| 0 | 0 | 0 |
| 1 | 0 | 1 |
| 0 | 1 | 1 |
| 1 | 1 | 1 |
FIG. 9b
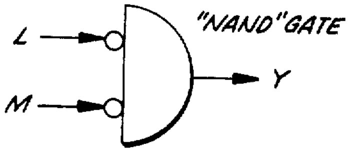
FIG. 10a
"NAND" GATE TRUTH TABLE
| L | M | Y |
|---|---|---|
| 0 | 0 | 1 |
| 0 | 1 | 1 |
| 1 | 0 | 1 |
| 1 | 1 | 0 |
FIG. 10b
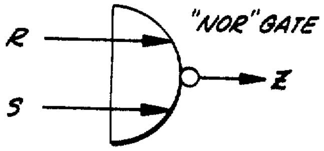
FIG. 11a
"NOR" GATE TRUTH TABLE
| R | S | Z |
|---|---|---|
| 0 | 0 | 1 |
| 1 | 0 | 0 |
| 0 | 1 | 0 |
| 1 | 1 | 0 |
FIG. 11b
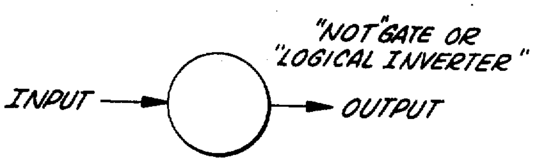
FIG. 12a
"NOT" GATE OR
LOGICAL INVERTER"
TRUTH TABLE
| INPUT | OUTPUT |
|---|---|
| 1 | 0 |
| 0 | 1 |
FIG. 12b

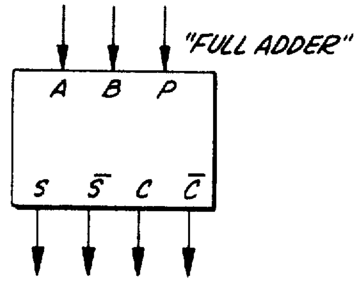
FIG. 13a
"FULL ADDER" CHARACTERISTIC TABLE
| A | B | P | S | $\bar{S}$ | C | $\bar{C}$ |
|---|---|---|---|---|---|---|
| 0 | 0 | 0 | 1 | 0 | 1 | 0 |
| 0 | 0 | 1 | 0 | 1 | 1 | 0 |
| 0 | 1 | 0 | 0 | 1 | 1 | 0 |
| 0 | 1 | 1 | 1 | 0 | 0 | 1 |
| 1 | 0 | 0 | 0 | 1 | 1 | 0 |
| 1 | 0 | 1 | 1 | 0 | 0 | 1 |
| 1 | 1 | 0 | 1 | 0 | 0 | 1 |
| 1 | 1 | 1 | 0 | 1 | 0 | 1 |
FIG. 13b
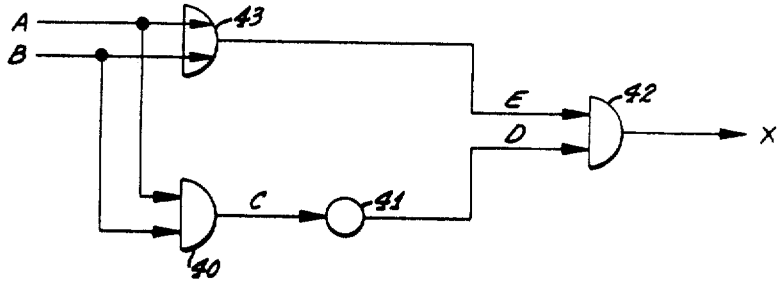
FIG. 14
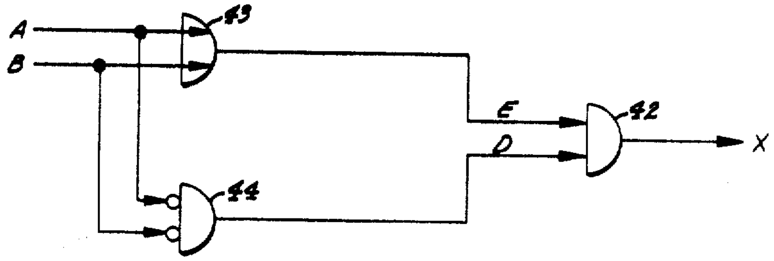
FIG. 15

CIRCULAR LISTING

Filed Nov. 23, 1966 22 Sheets-Sheet 8

| STATES OF TIME COUNTER SEQUENCE FLIP-FLOPS | | | TIMING SIGNALS WHICH ARE "ONE" | | EQUATIONS FOR THE PULSES WHICH ADVANCE THE TIME COUNTER TO ITS NEXT STATE |
|---|---|---|---|---|---|
| F1TCSA | F1TCSB | F1TCSC | | | |
| 0 | 0 | 0 | TT0E | TCTS | $(\overline{TCSA})(\overline{TCSB})(TCKA)$ |
| 0 | 0 | 1 | TT1E | TCTS | $(\overline{TCSA})(\overline{TCSB})(TCKA)$ |
| 0 | 1 | 0 | TT2E | TCTS | $(TT2E)(TCKA)(CDRA+\overline{MREQ}+IRMS)$ |
| 1 | 1 | 0 | TT3E | TCTA | $(TCKA)(TT3E)$ |
| 1 | 0 | 0 | TT4E | TCTA | $(TLPS)$ |

Fig. 17

CIRCULAR LISTING

Filed Nov. 23, 1966 22 Sheets-Sheet 9

NORMAL SEQUENCE CONTROL STATE 1

NORMAL SEQUENCE CONTROL STATE 2

| COMMAND | F FIELD MODIFICATION | N FIELD MODIFICATION | AFFECTED STORAGE LOCATION (Z IS LIST CONTROL WORD ADDRESS) |
|---|---|---|---|
| ABL | F-1→F | N+1→N | Z+1+(F) |
| AEL | F→F | N+1→N | Z+1+(F+N+1) |
| RBL | F+1→F | N-1→N | Z+1+(F+1) |
| REL | F→F | N-1→N | Z+1+(F+N) |

TIMING DIAGRAM ABL COMMAND

TIMING DIAGRAM AEL COMMAND

TIMING DIAGRAM RBL COMMAND

TIMING DIAGRAM REL COMMAND

Oct. 14, 1969 L. A. GOSHORN ET AL 3,473,161

CIRCULAR LISTING

Filed Nov. 23, 1966 22 Sheets-Sheet 1

J COUNTER

CIRCULAR LISTING

SEQUENCE CONTROL STATE 3 FIG. 37

CIRCULAR LISTING

Filed Nov. 23, 1966 22 Sheets-Sheet 20

SEQUENCE CONTROL STATE 4

SEQUENCE CONTROL STATE 5
ABL AND AEL COMMANDS

SEQUENCE CONTROL STATE 5
RBL AND REL COMMANDS

United States Patent Office 3,473,161
Patented Oct. 14, 1969

3,473,161

CIRCULAR LISTING

Larry A. Goshorn, Villa Park, Calif., and Sherril A. Harmon, Phoenix, Ariz., assignors to General Electric Company, a corporation of New York Filed Nov. 23, 1966, Ser. No. 596,666
Int. Cl. G06f 9/06
U.S. Cl. 340—172.5 28 Claims

ABSTRACT OF THE DISCLOSURE

After description of an information processing system, apparatus for providing communication between a memory unit and an arithmetic unit thereof is related. A List Command Word in the arithmetic unit includes a field specifying an address in the memory unit for a List Control Word and a field specifying a command to enter or remove an information item to or from the beginning or ending of the list. The List Control Word provides fields defining the current status of the list including the maximum length, the number of items currently stored in the list, and whether the list is full or empty, and in addition provides a field used for developing the address of storage locations in the memory unit of the removable and enterable beginning and ending list items. In response to the command or the List Command Word, apparatus is provided to employ the List Control Word in variable-modulo arithmetic to remove or enter an item and apparatus is provided to update the List Control Word during execution of the list command.

Electronic information processing systems may be roughly divided, according to one set of criteria, into two basic groups; viz non-real time and real time. The distinction is found mainly in the character of reaction required in response to detected contemporaneous events which occur either inside or outside an information processing system. A non-real time information processing system need not necessarily respond to the occurrence of an event within its influence time. Often, however, a real time information processing system must so respond to avoid undesirable or even catastrophic consequences which could otherwise follow the event.

An example of a real time information processing system is a process computer. Process computers are used to monitor and/or control industrial processes or the like. They are real time information processors because they are required to detect events and alter their information flow accordingly to provide output signals which may institute remedial action, sound alarms, or provide some other appropriate response within the influence time of the event. For example, a process computer may be utilized for controlling a steam turbine electric power generating unit for an electric utility. In such a control, unusual conditions on the output line may automatically cause the normal generator protection apparatus to remove the generator from the line. As a consequence, the prime moving turbine tends to speed up very quickly because it is no longer heavily loaded by, and frequency-slaved to, the power grid but is nonetheless still supplied with a vast amount of steam. To keep the turbine and generator from overspeeding, which could cause catastrophic damage, safety valves in the steam supply lines automatically open under these conditions. The process computer must detect these and a myriad of related events and respond quickly to restore the system to a safe condition by analyzing the events and their sequence and issuing appropriate output signals which may cause valves to be opened or closed, breakers to be actuated, alarms to be sounded, etc., to effect a complete shutdown or to prepare the unit for a restart.

In general, a typical process for which process computer control and/or monitoring is contemplated is characterized by the occurrence of many such events or subprocesses, some occurring continuously, some occurring periodically, and others occurring randomly. Hence, a real time information processor is required to perform many functions, seemingly simultaneously. However, a digital computer is by nature a serial device when considered at the instruction level; that is, it can perform its program steps only in a serial fashion, one by one. It is by virtue of the extreme speed at which it operates that a digital computer can be successfully employed in process control and/or monitoring applications. In order that a process computer program may be able to serve the functional needs of the controlled or monitored process, a priority system must be established for the many system functions. Simultaneous occurrence of certain combinations of events may then require a temporary reassignment of priorities. As a consequence of these requirements, real-time programs are distinctively different from their non-real-time counterparts.

A real-time computer program becomes in reality a system of programs which service the process functions in accordance with an established priority scheme. These programs operate under an "executive control" program in such a manner that they interrupt one another as the changing process requirements dictate. There must, of course, be an underlying order in the seeming chaos which results from the interaction of so many programs. Thus, it is an inherent requirement of the executive control program that it perform efficiently a large amount of "bookkeeping" or "housekeeping" functions. Indeed, the housekeeping functions, necessary to some degree in all computer programs, prove to be of primary importance in a real-time system program.

It becomes apparent that in the creation of real time information processing apparatus, cognizance must be given to the unique requirements of real time programs which distinguish them from programs written for non-real-time information processing applications. At the same time, an advancement in the art which improves real-time performance may find important utility in a non-real-time environment where the advancement is one of time and/or power efficiency.

Stored lists are commonly utilized in both real time and non-real time information systems. A list comprises a series of more or less related digital words stored in any desired number of sequential locations within the memory of the information processing system. With ordinary listing techniques, each word or item in the list is addressed directly from a command being analyzed and executed to utilize or affect a specific item in the list. The command may have been modified prior to its execution to reach a particular item in a list according to well-known techniques such as indexing. However, the items making up such a list all have the same priority level.

A need has existed for providing the capability of multi-level priority listing. For example, it is well known that any list may typically be employed for queuing or channeling information to or from input/output devices. To illustrate, if information were being placed into a list in anticipation of output to a display device such as a typewriter, the list would be partially or wholly filled in a methodical manner by addressing each memory location individually. Removal can then be effected in a similar manner as time availability and readiness of the display typewriter permits. However, it is desirable that high priority items be handled first. Such a high priority item might be an alarm indicating a dangerous condition within the monitored or controlled system which must be typed out or otherwise displayed as quickly as possible. To achieve this capability, the concept of "circular" listing has been developed. With circular listing, an entire list shares a common address in memory which contains a control word specifing: the maximum size of the list, the memory address of an Enterable Beginning Item of the list, the number of items currently in the light, and whether the list is currently either empty or full. Circular listing permits the appendage to or removal from a list to either the beginning or the end of the list. Thus, high priority items may be appended to the beginning of a list so that it would be the next item to be removed by a program which repeatedly addresses the beginning item.

It is therefore one object of this invention to provide apparatus to implement fully automatic circular listing.

It is a more specific object of this invention to provide apparatus to selectively append or remove items from the beginning or the end of a list, the beginning and ending item in a list being appended or removed by addressing a list control word in response to signals generated from unique command words decoded by the information processor.

It is a further object of this invention to provide means for automatically modifying list control words in accordance with specific appendage or removal commands which are executed.

The foregoing objects are achieved, according to one embodiment of the instant invention, by providing apparatus responsive to signals decoded from "List" command words, which command words have an operand address portion specifying the address of a List Control Word; and by the further provision of means whereby the decoded signals initiate a sequence of operations including the transfer of the List Word from its storage location in memory to the information processor arithmetic unit. The List Control Word is decoded to determine the current status of the list it represents and to carry out the specified appendage to or removal from the list as defined in an operation code portion of the List command word. Additional apparatus is provided responsive to signals decoded from the List command word to update the List Control Word in accordance with the specific operation carried out. According to which List command is being executed, the portions of the List Control Word which specify the relative address of the Enterable Beginning Item of the list and the number of items currently in the list are individually incremented or decremented by a count of one or are unchanged. If the list becomes full or empty upon execution of a List command, third or fourth fields of the list control word are modified to indicate this current condition. Apparatus is also provided to automatically restore the List Control Word to its appropriate storage location in memory upon successful execution of an appendage or removal List command. In addition, apparatus is provided to transfer program control to one or the other of two alternate memory storage locations according to whether the appendage or removal was successful or unsuccessful.

The subject matter of the invention is particularly pointed out and distinctly claimed in the concluding portion of the specification. The invention, however, both as to organization and method of operation, may best be understood by reference to the following description taken in connection with the accompanying drawings, in which:

FIGURE 2 is a table showing the relationship between decimal numbers and binary numbers;

FIGURE 3 is a table showing the relationship between binary numbers and octal numbers with reference to a word comprising twenty-four binary digits;

FIGURE 4 is a symbolic diagram illustrating the format of the various command words employed in the system of FIGURE 1;

Figure 1:
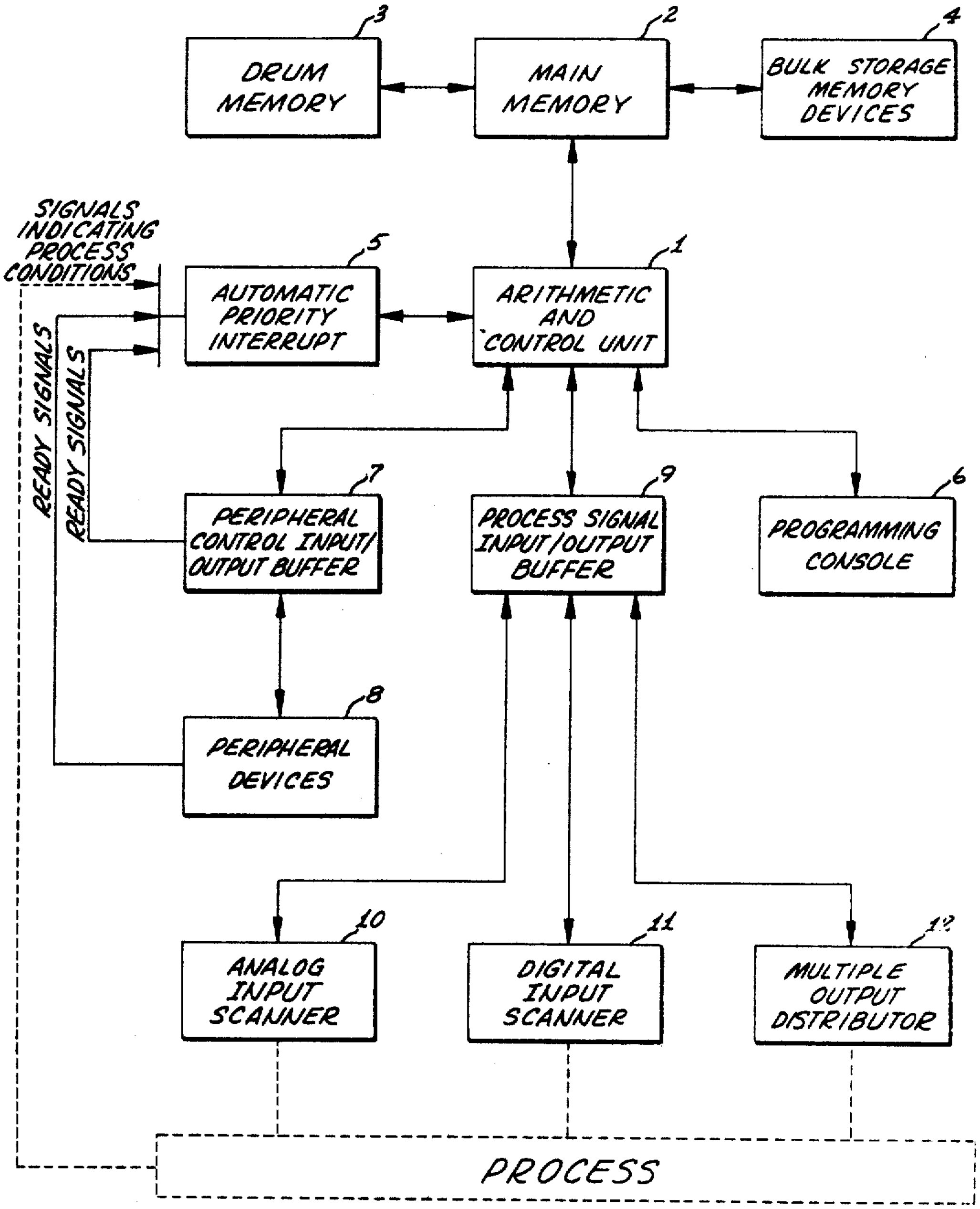
FIGURE 1 is a block diagram of an information processing system to which the instant invention is applicable.
Figure 5:
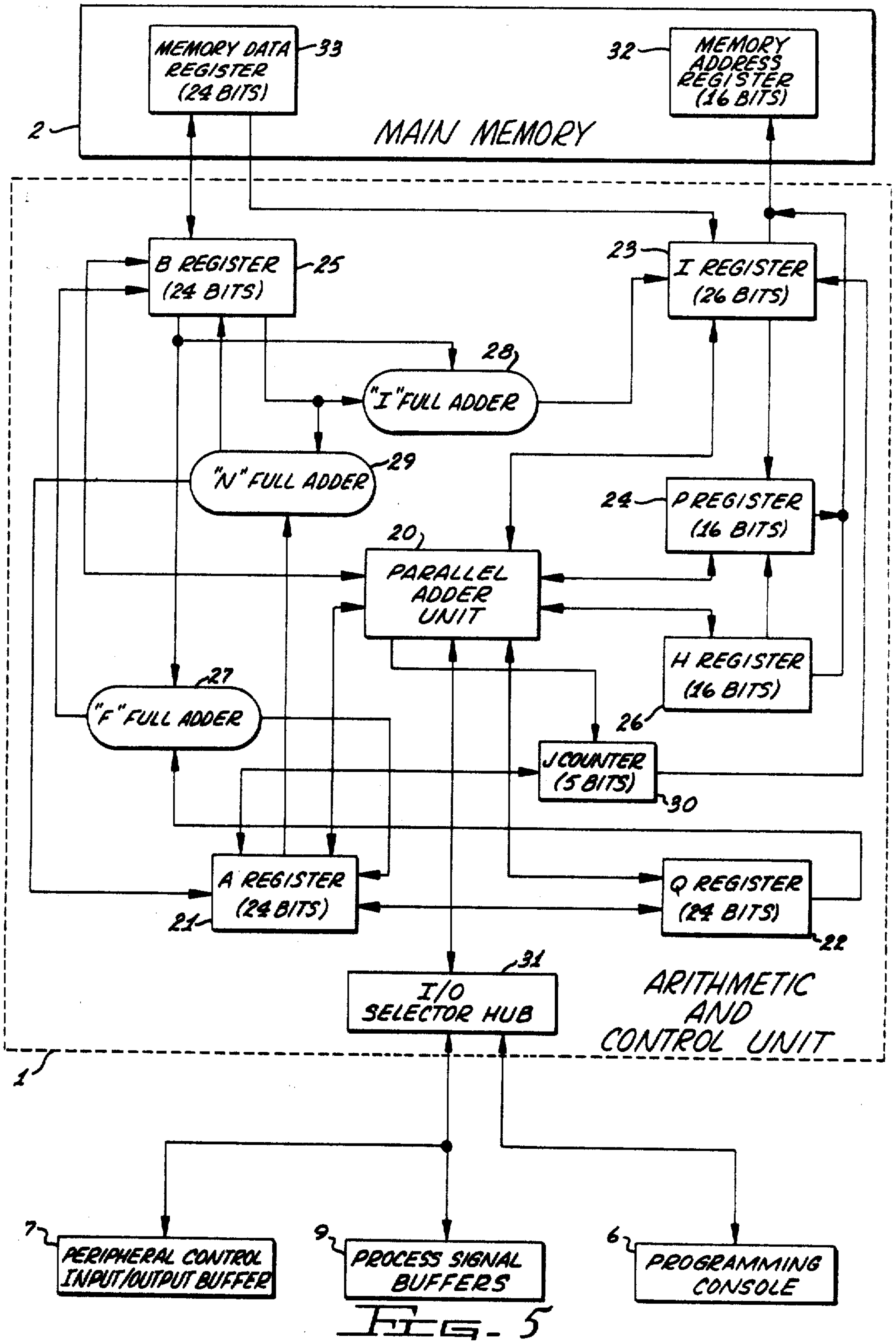
FIGURE 5 is a block diagram of the arithmetic and control unit utilized in the information processing system of FIGURE 1.
Figure 6A:
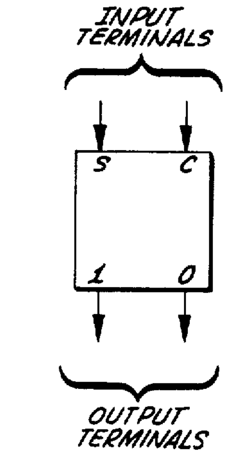
Figure 6B:
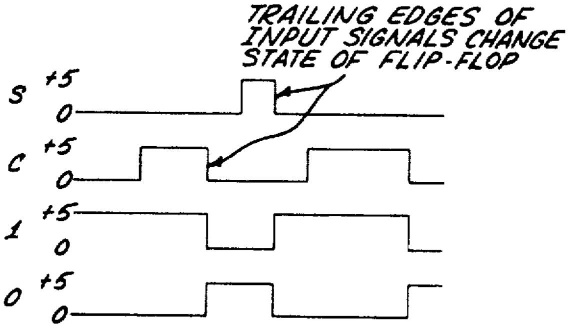
Figure 7A:
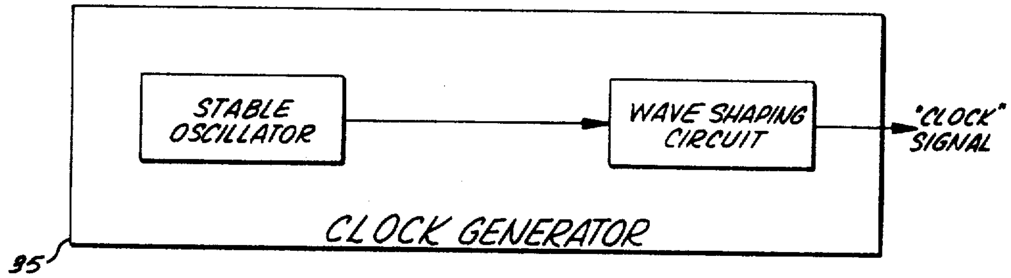
Figure 7B:
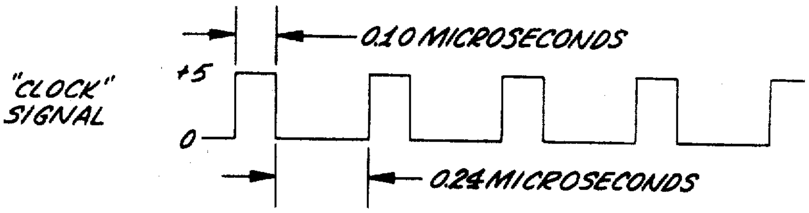
Figure 16:
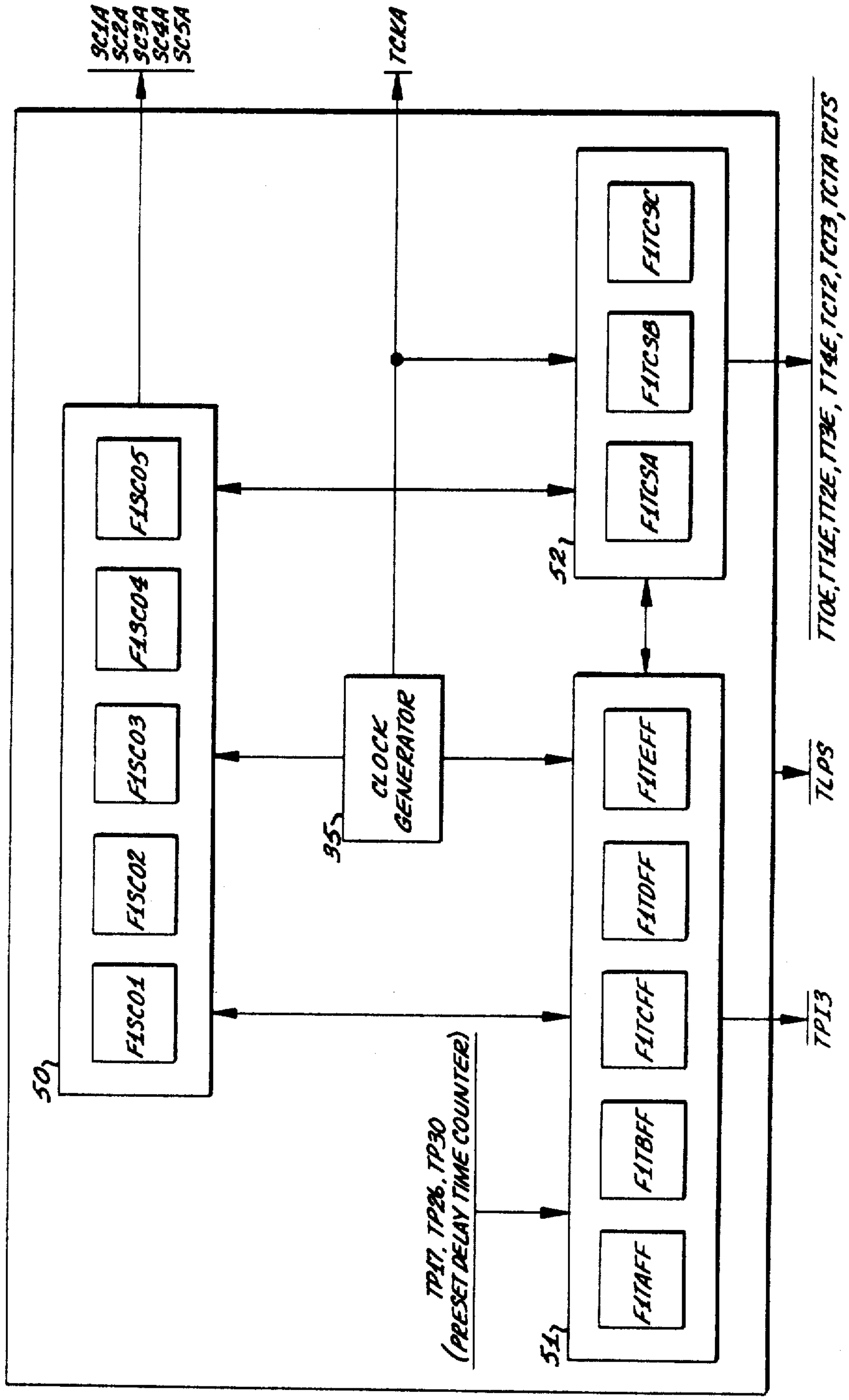
Figure 18:
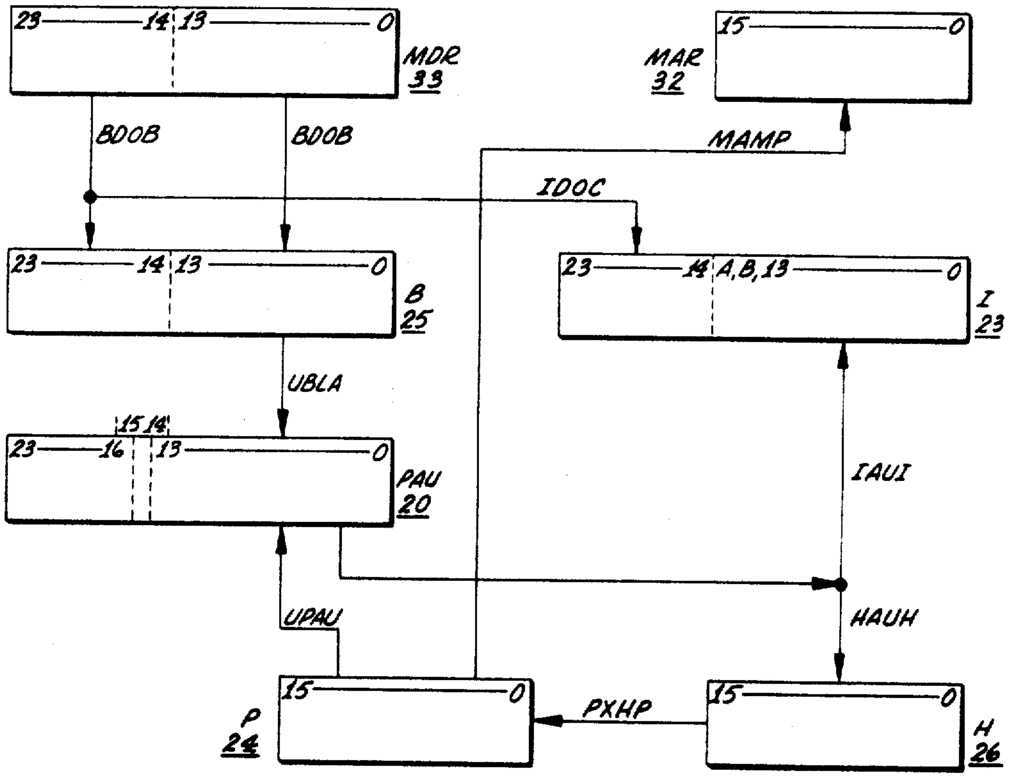
Figure 19:
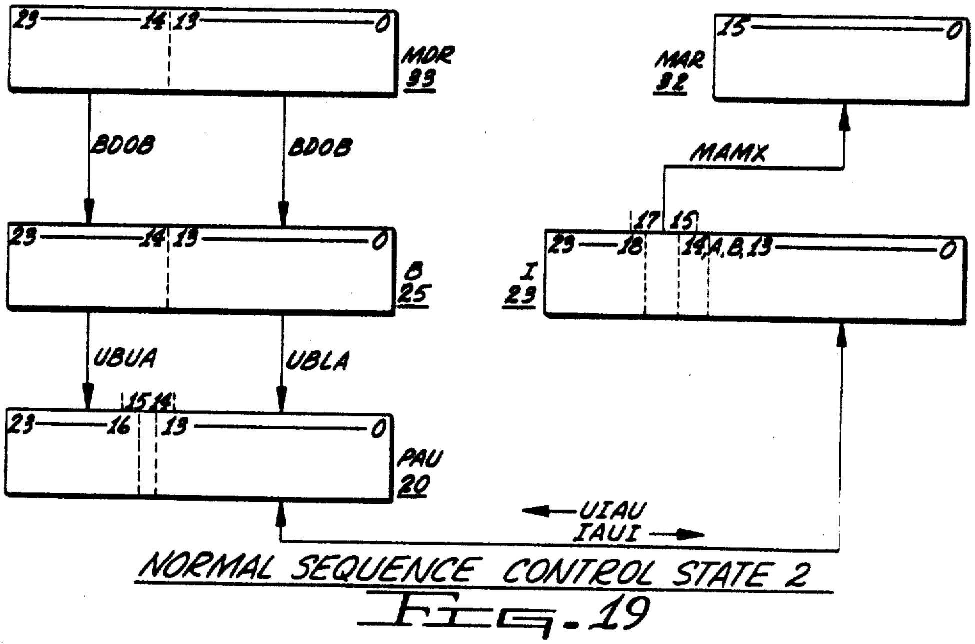
Figure 20:
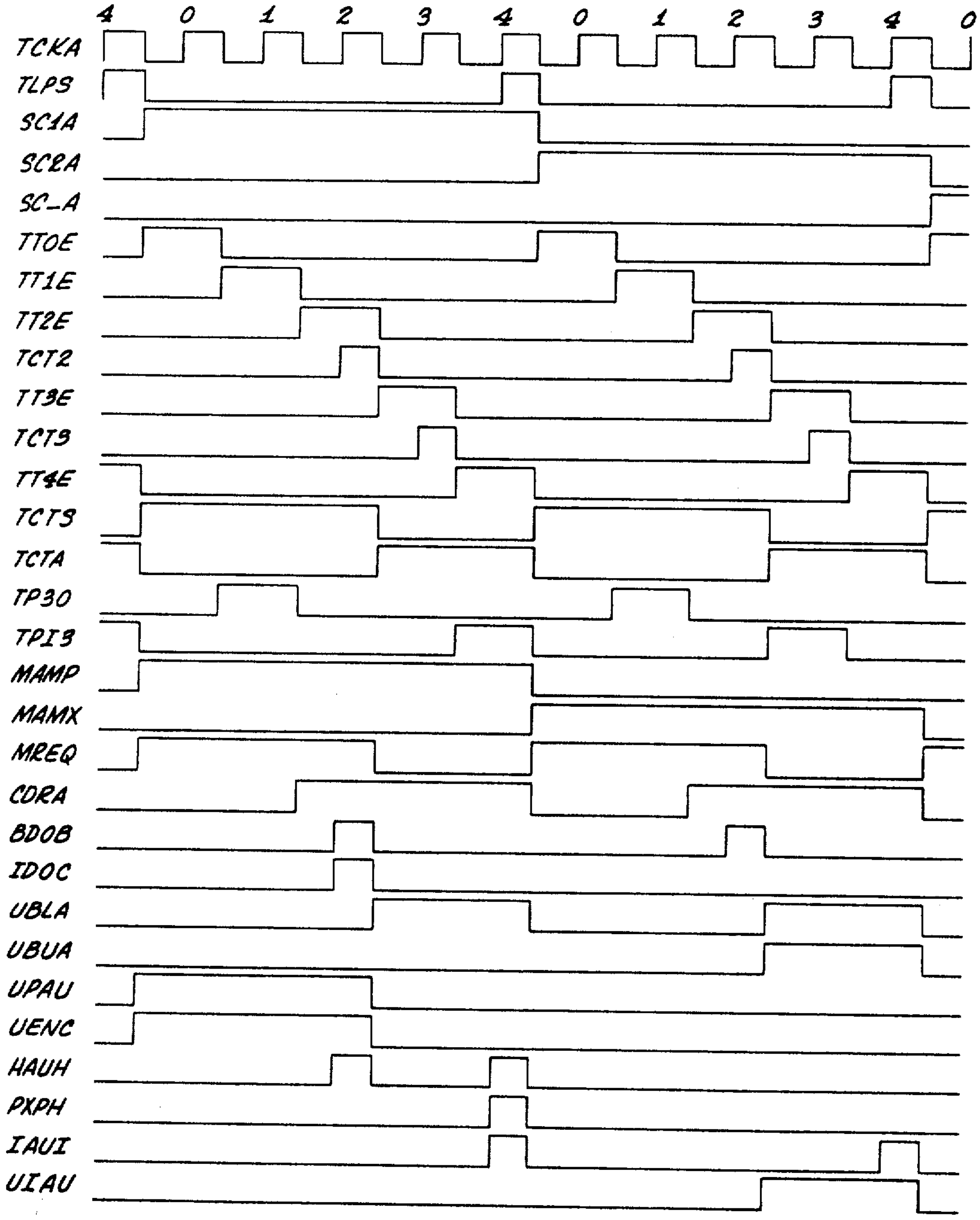
Figure 21:
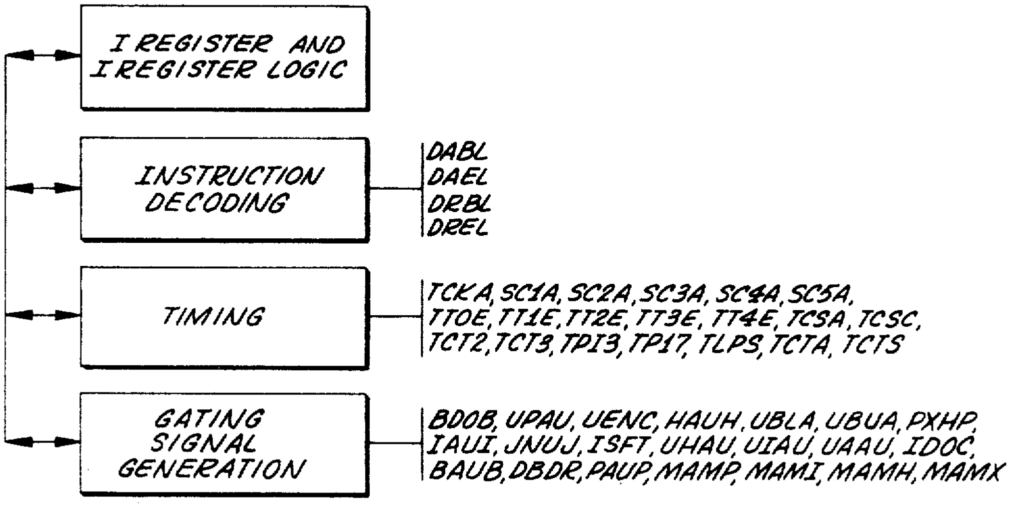
Figure 22A:
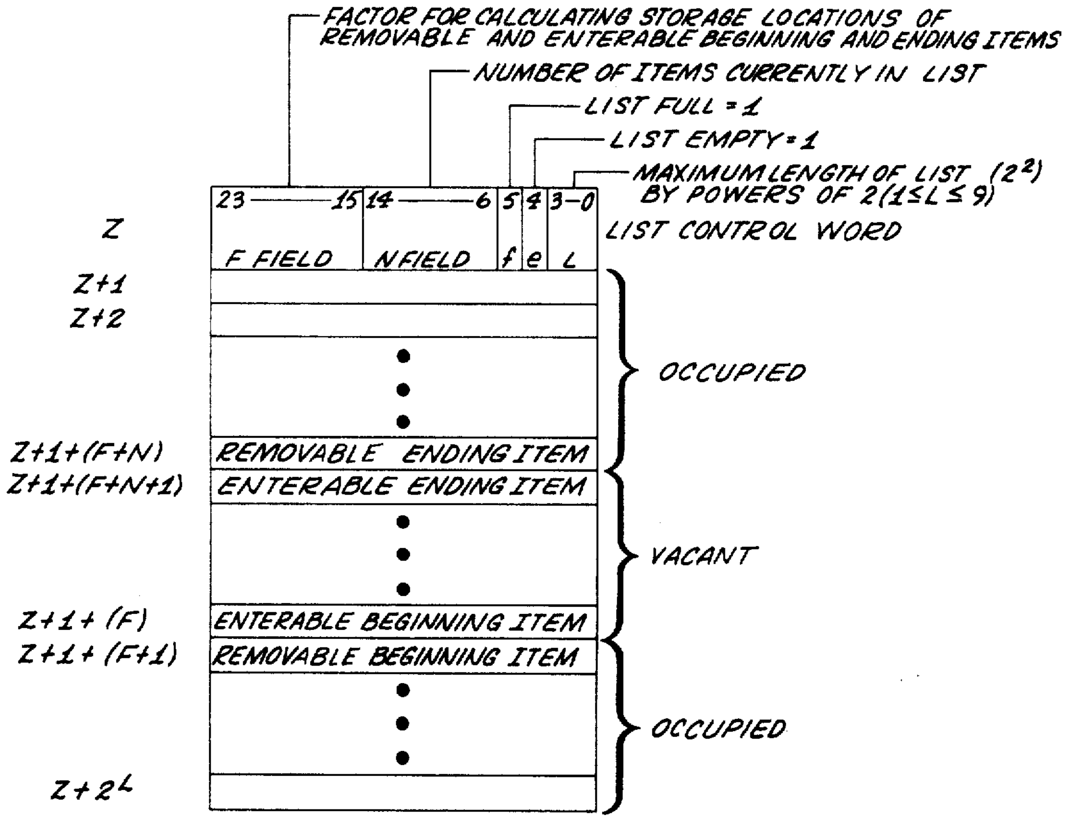
Figures 22B, 22C:
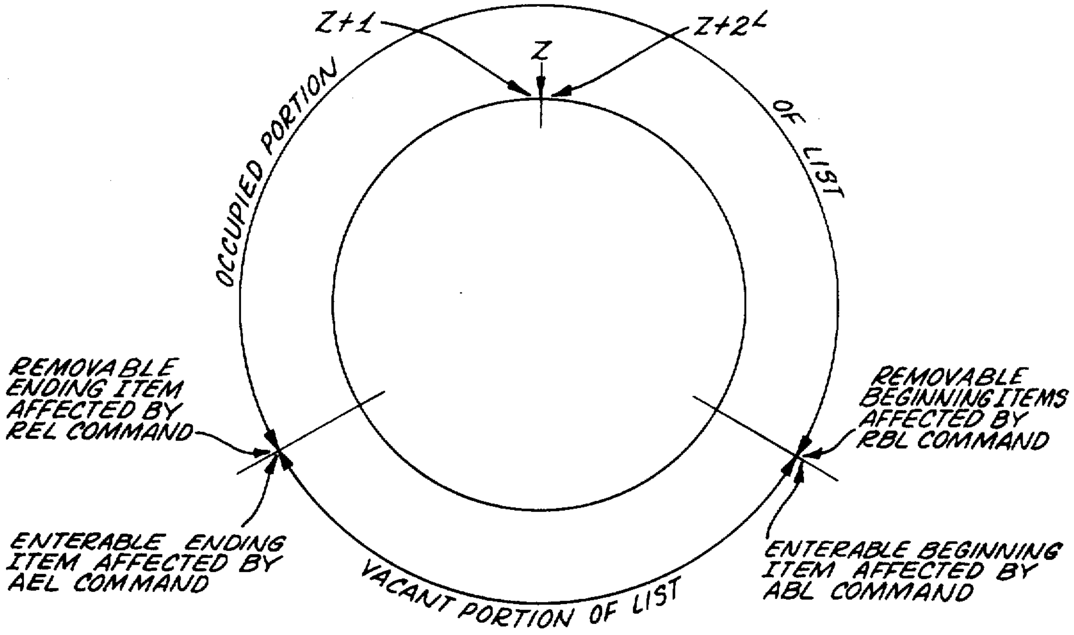
Figure 32:
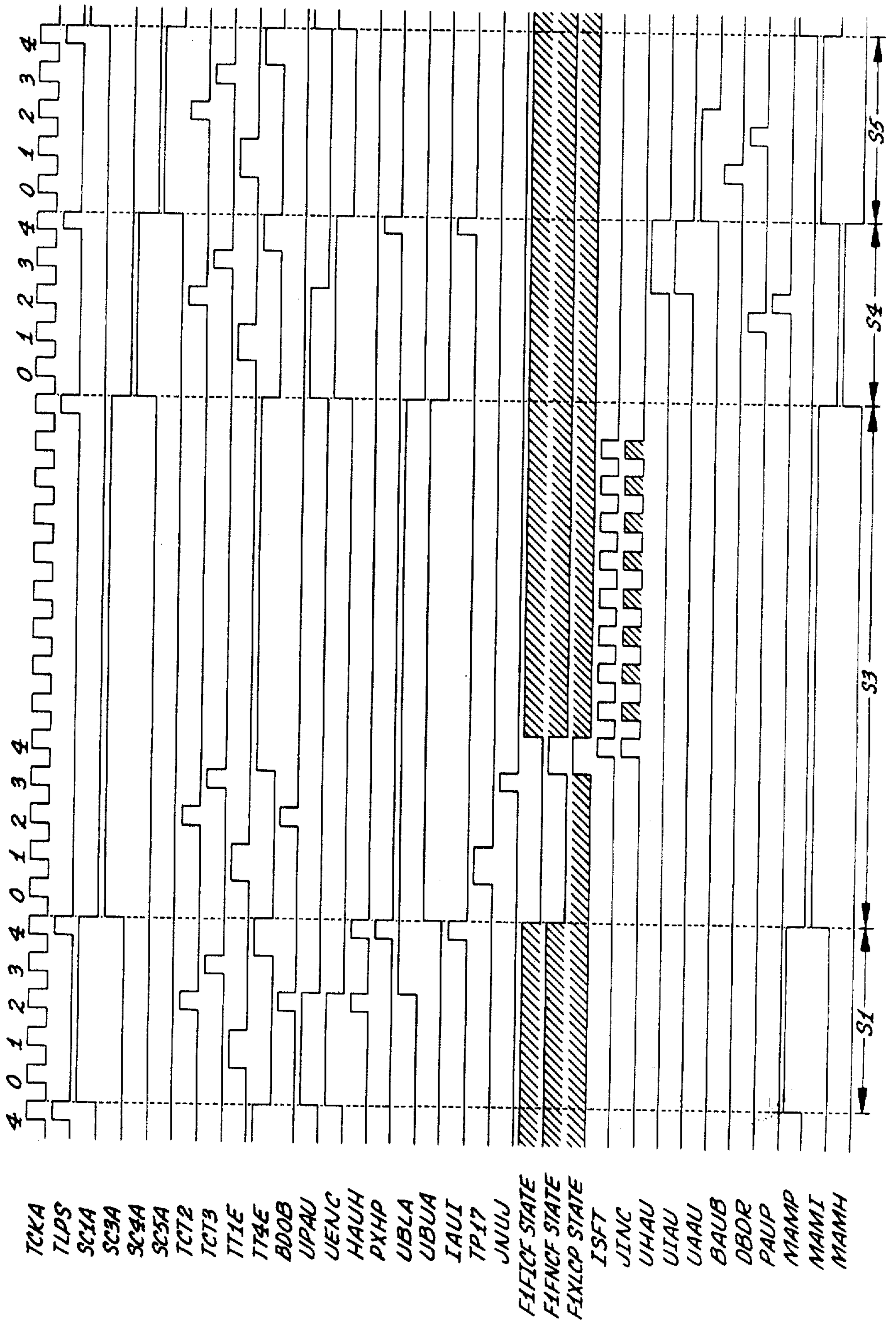
Figure 33:
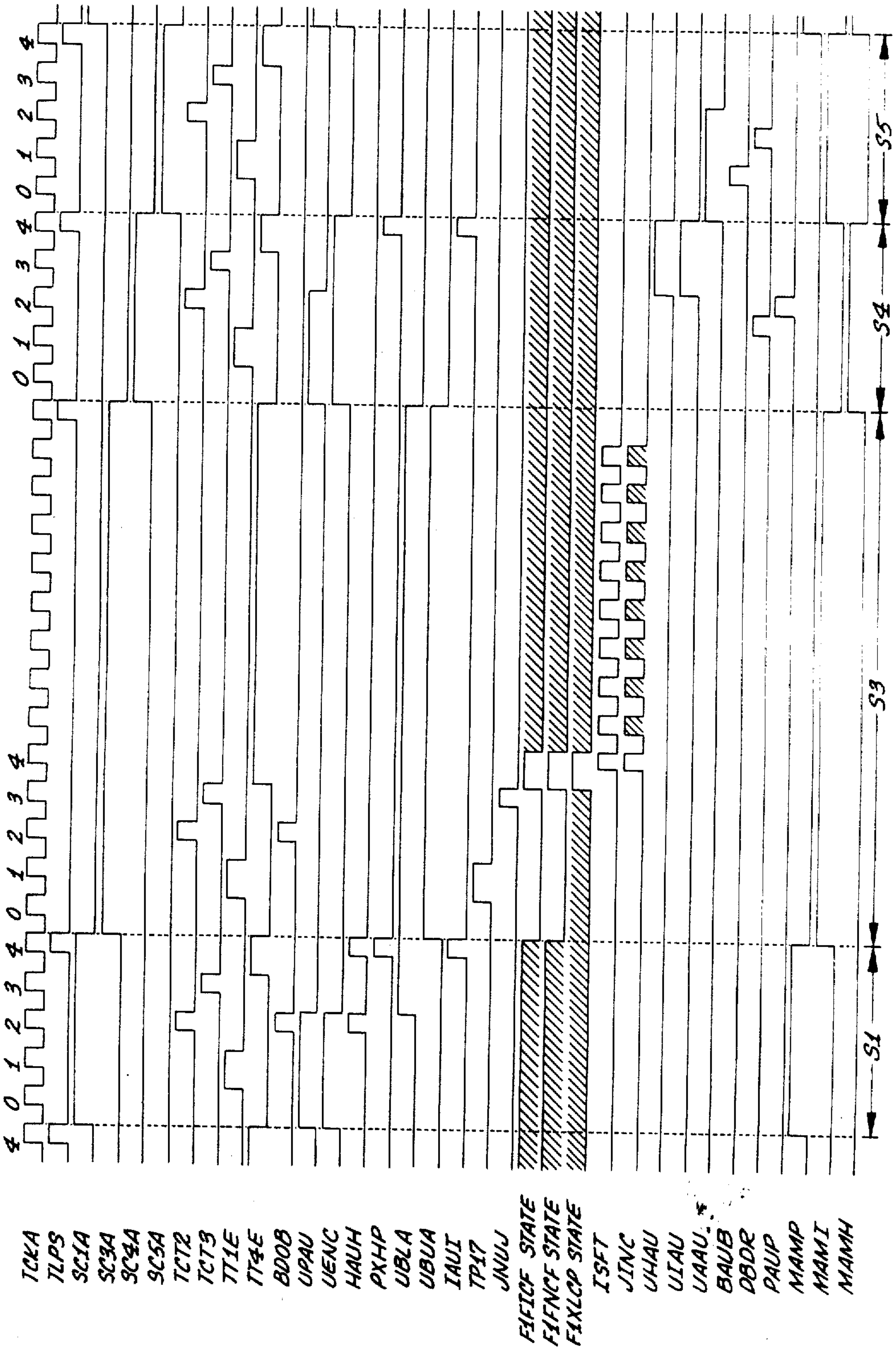
Figure 34:
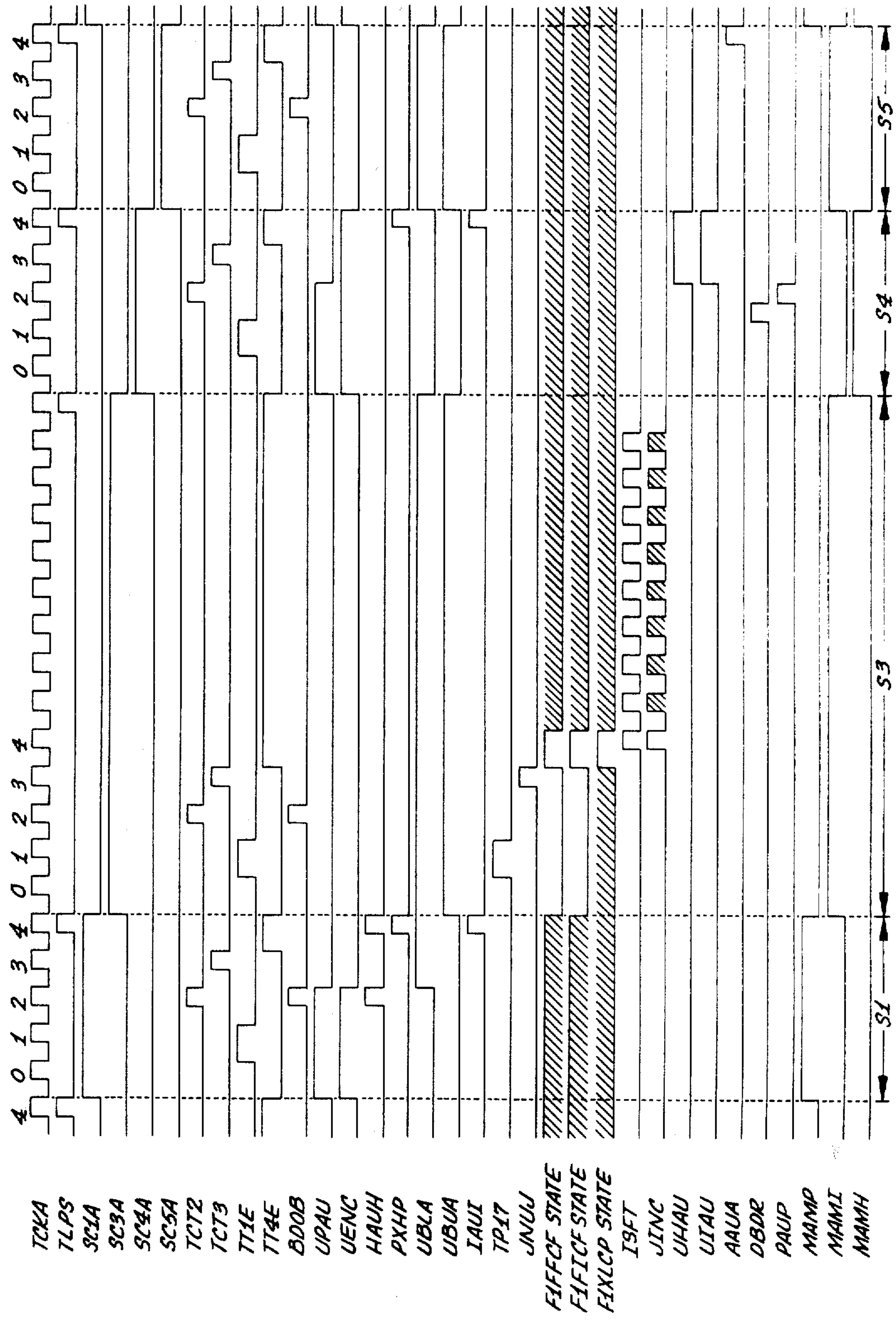
Figure 35:
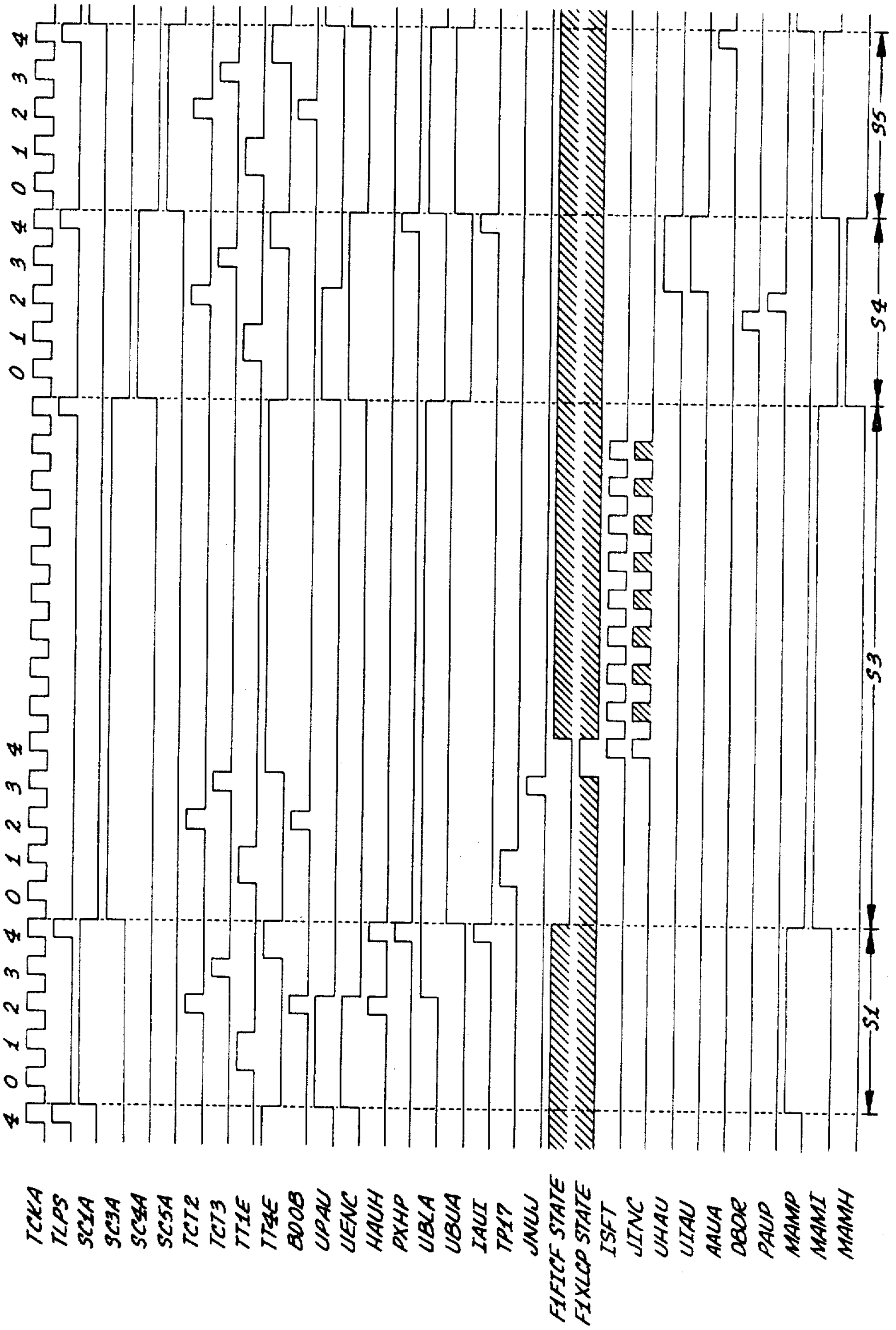
Figure 36:
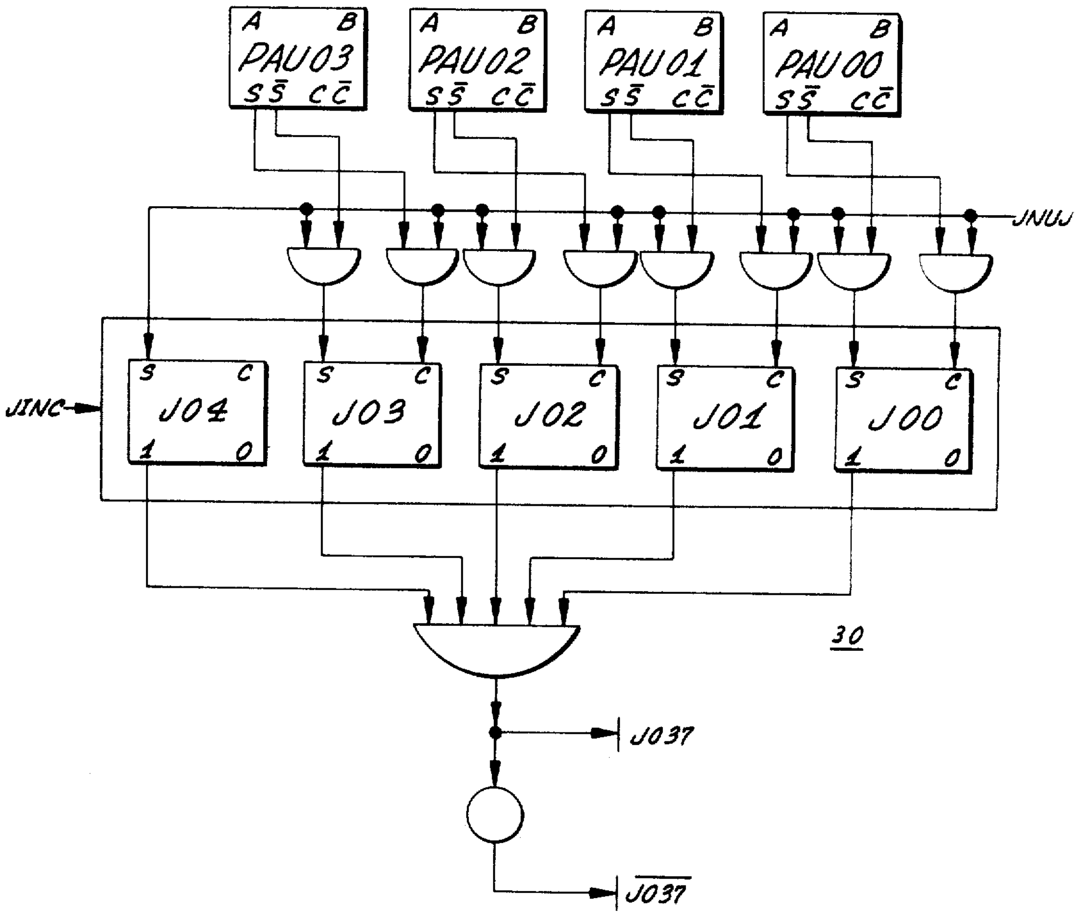
Figure 37:
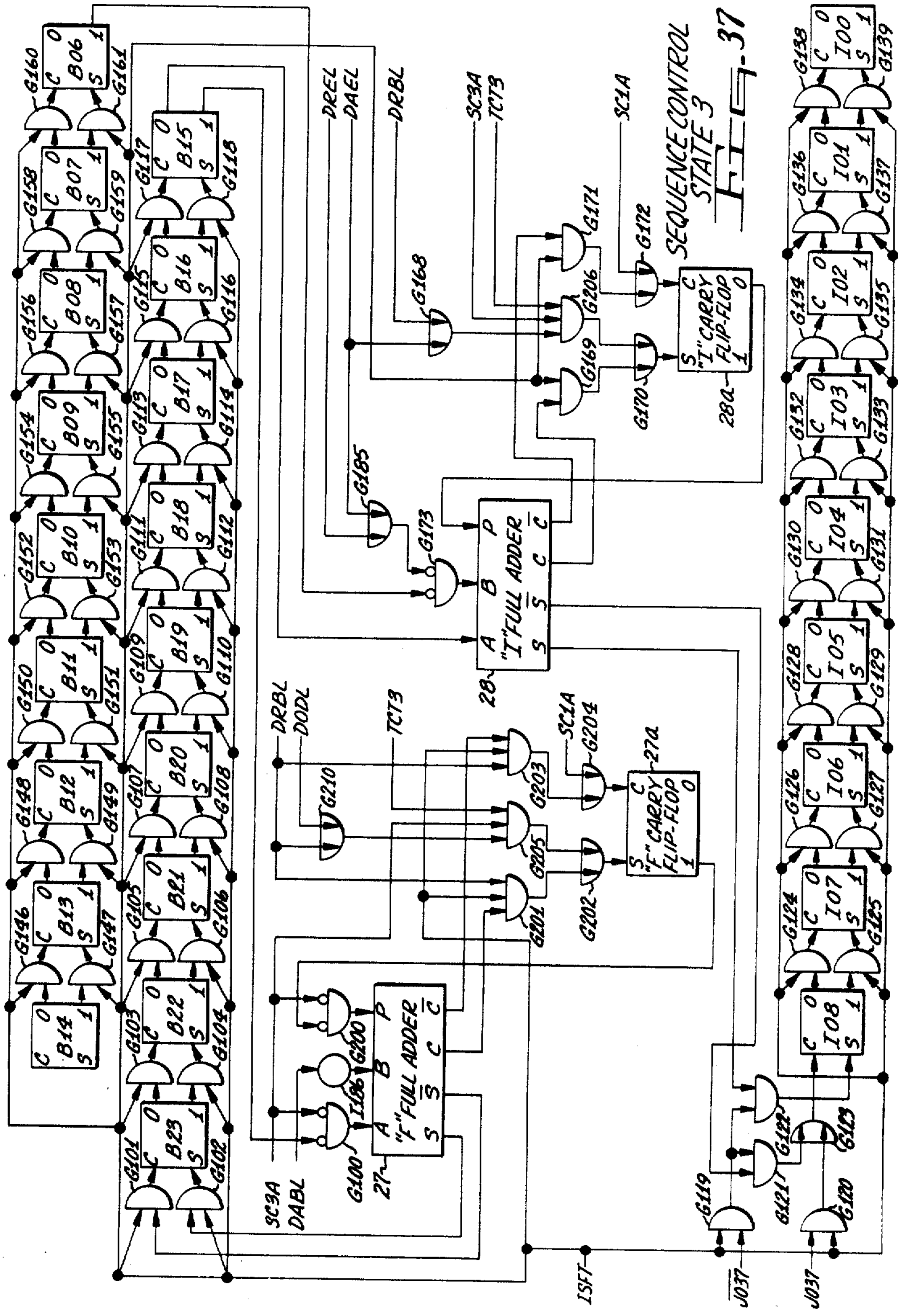
Figure 38:
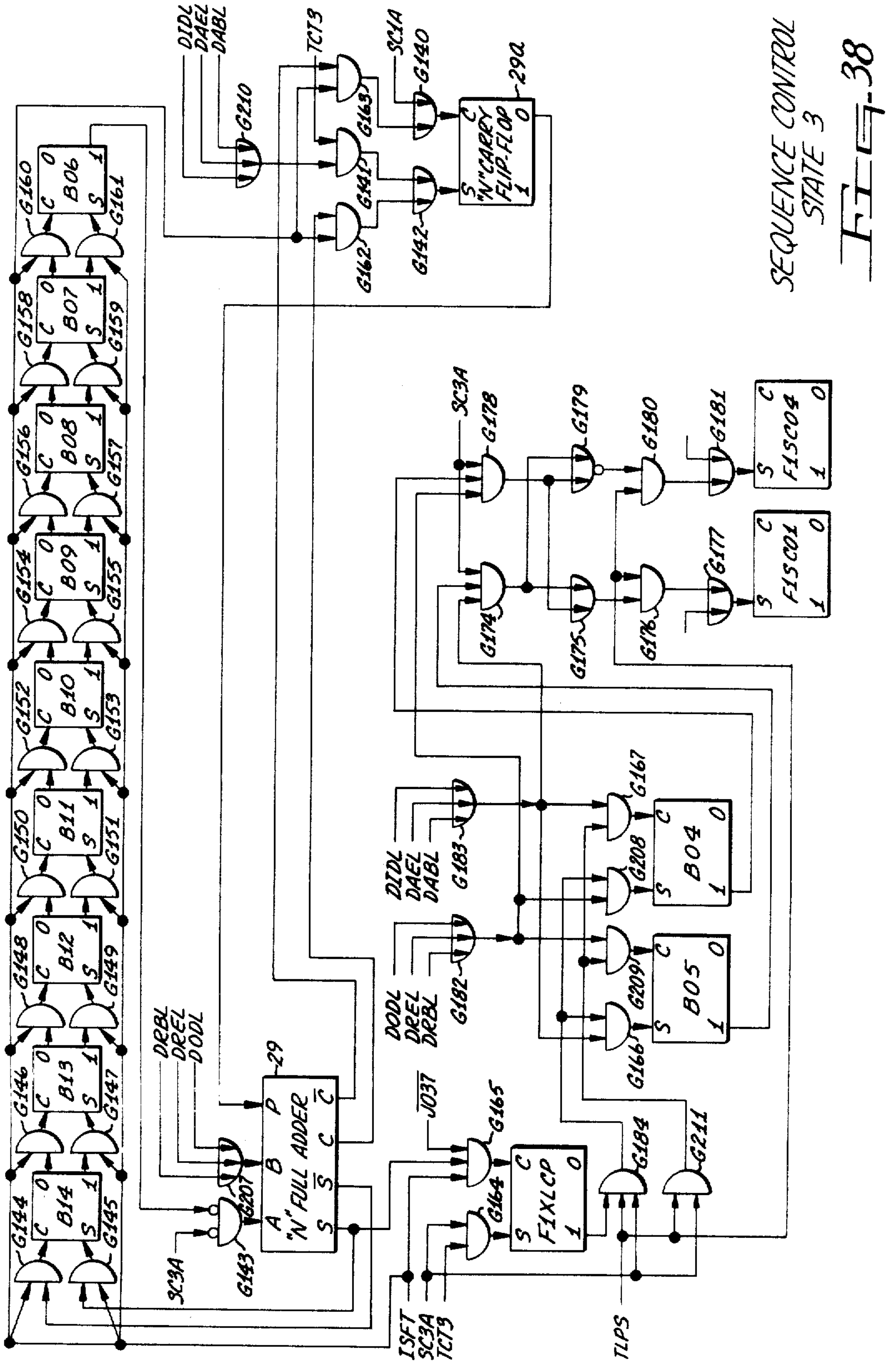
Figure 39:
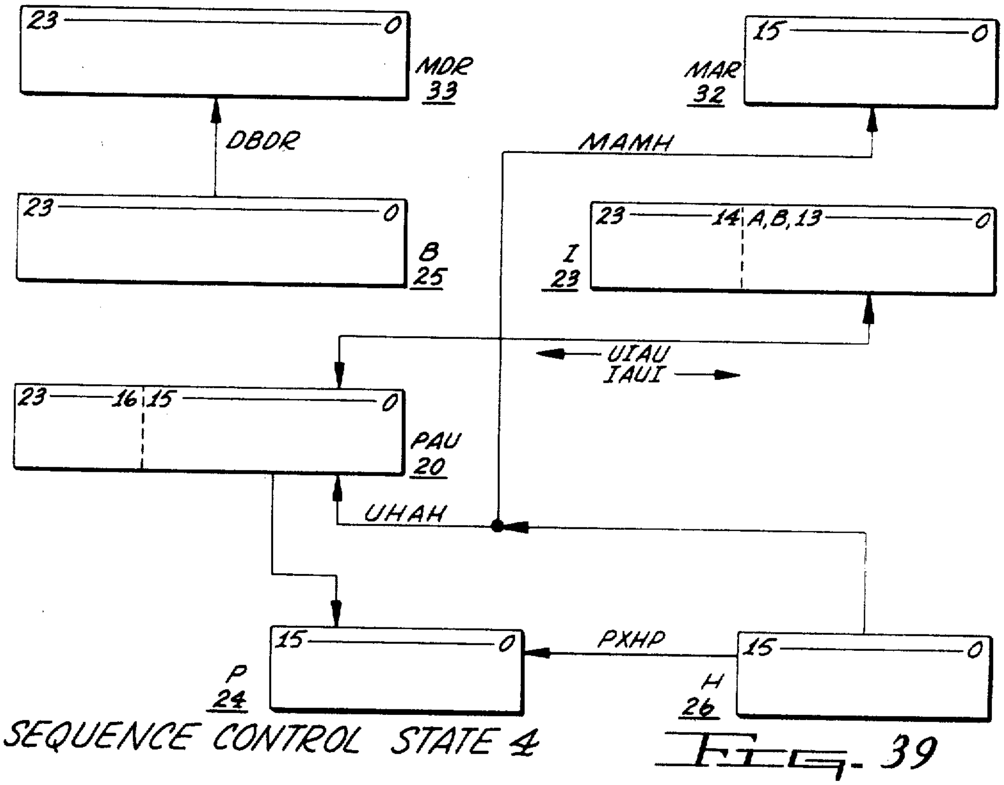
Figure 40:
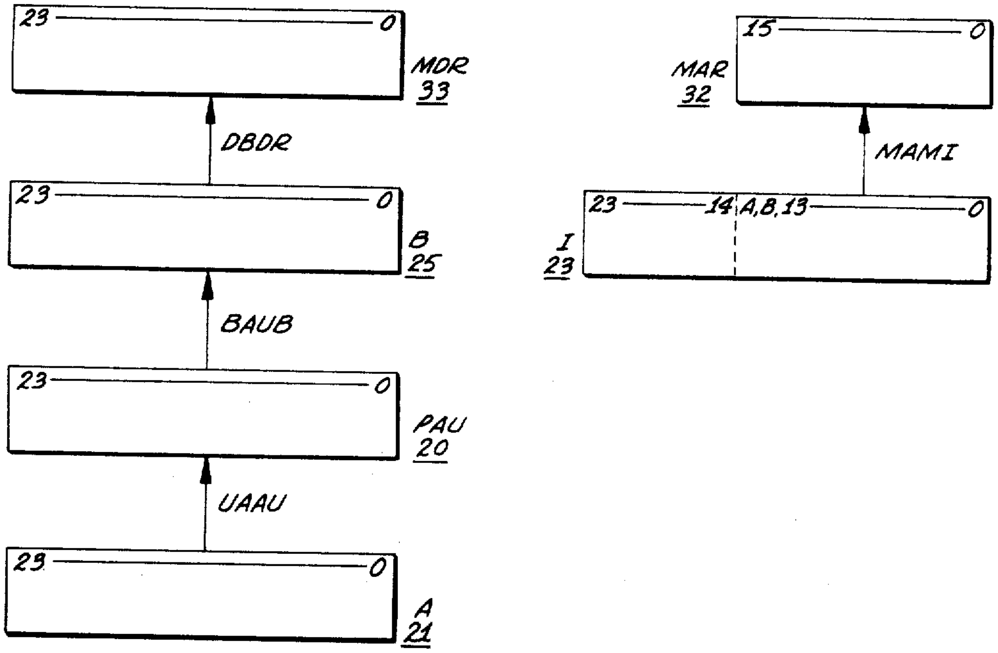
Figure 41:
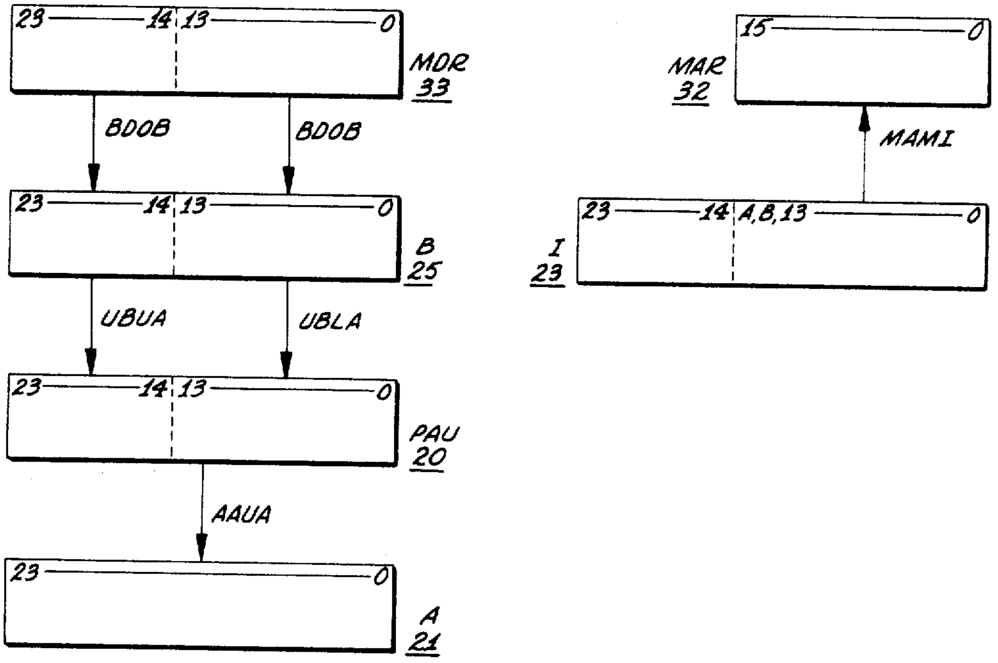

FIGURE 6*a* is a logic symbol for a Flip-Flop, and FIGURE 6*b* is a diagram showing the relationship between the input and output signals of the Flip-Flop of FIGURE 6*a*;

FIGURE 7*a* is a block diagram of a clock signal generator utilized in the information processing system of FIGURE 1, and FIGURE 7*b* is a voltage/time diagram of the output of the clock signal generator of FIGURE 7*a*;

FIGURE 8*a* is a logic symbol for an AND gate, and FIGURE 8*b* is a truth table for the AND gate of FIGURE 8*a*;

FIGURE 9*a* is a logic symbol for an OR gate, and FIGURE 9*b* is a truth table for the OR gate of FIGURE 9*a*;

FIGURE 10*a* is a logic symbol for a NAND gate, and FIGURE 10*b* is a truth table for the NAND gate of FIGURE 10*a*;

FIGURE 11*a* is a logic symbol for a NOR gate, and FIGURE 11*b* is a truth table for the NOR gate of FIGURE 11*a*;

FIGURE 12*a* is a logic symbol for a NOT gate or logical inverter, and FIGURE 12*b* is a truth table for the NOT gate or logical inverter of FIGURE 12*b*;

FIGURE 13*a* is a logic symbol for a serial full adder, and FIGURE 13*b* is a characteristic table for the serial full adder of FIGURE 13*a*;

FIGURE 14 is a logic diagram of a logic network which performs an Exclusive OR function;

FIGURE 15 is a logic diagram of an alternative logic network which performs an Exclusive OR function;

FIGURE 16 is a block diagram of the timing logic area of the arithmetic and control unit of FIGURE 5;

FIGURE 17 is a table showing the relationship between three Flip-Flops comprising a Sequence Time Counter in the timing logic area, the signals which issue from the Sequence Time Counter, and the logic equations of signals which advance the Sequence Time Counter from one state to the next;

FIGURE 18 is a block diagram indicating the major information flow paths opened between various registers of the arithmetic and control unit of FIGURE 5 in a normal first sequence control state during the execution of a typical command;

FIGURE 19 is a block diagram indicating the major information flow paths opened between various registers of the arithmetic and control unit of FIGURE 5 in a normal second sequence control state during the execution of a typical command;

FIGURE 20 is a timing diagram illustrating the timing sequence of signals which effect the information movement indicated in FIGURES 18 and 19 and also illustrating the interrelationship of the timing signals generated in the timing logic area of FIGURE 16;

FIGURE 21 is a block diagram showing the major logic areas of the arithmetic and control unit of FIGURE 5 from which predetermined signals issue;

FIGURE 22*a* is a diagram representing a fixed length block of memory reserved for a circular list and also illustrating the format of a List Control Word stored in the first memory location of the block;

FIGURE 22*b* is a diagram symbolically illustrating the circular nature of the list of FIGURE 22*a*;

FIGURE 22*c* is a table showing the modifications which occur to "F" and "N" Fields of a List Control Word during execution of List commands and the storage location affected by each List command relative to an address Z of the storage location in which the List Control Word is stored in terms of the "F" and "N" Fields before modification;

FIGURES 23–31 are diagrams representing the contents of an exemplary circular list as various operations are performed on it by the apparatus of the instant invention;

FIGURE 32 is a timing diagram useful in explaining the operation of the apparatus of the invention in executing an ABL command;

FIGURE 33 is a timing diagram useful in explaining the operation of the apparatus of the invention in executing an AEL command;

FIGURE 34 is a timing diagram useful in explaining the operation of the apparatus of the invention in executing an RBL command;

FIGURE 35 is a timing diagram useful in explaining the operation of the apparatus of the invention in executing an REL commnad;

FIGURE 36 is a block diagram illustrating the function of the J Counter in the arithmetic and control unit of FIGURE 5 during the execution of the ABL, AEL, RBL, and REL commands;

FIGURES 37 and 38 are logical schematic diagrams of the logic circuits providing critical bit manipulations, tests, and decisions occurring in a third sequence control state during execution of the ABL, AEL, RBL, and REL commands;

FIGURE 39 is a block diagram showing information flow paths opened in the arithmetic and control unit of FIGURE 5 in a fourth sequence control state during execution of the ABL, AEL, RBL, and REL commands;

FIGURE 40 is a block diagram showing information flow paths opened in the arithmetic and control unit of FIGURE 5 in a fifth sequence control state during execution of the ABL and AEL commands; and FIGURE 41 is a block diagram showing information flow paths opened in the arithmetic and control unit of FIGURE 5 in a fifth sequence control state during execution of the RBL and REL commands.

PROCESS COMPUTER SYSTEM

A diagram showing the organization of a process computer system and its relationship to a controlled or monitored process is presented in FIGURE 1. An Arithmetic and Control Unit 1 performs calculations and other logical operations and also sequences and distributes information throughout the system. It supplies information to and receives information from a Main Memory module 2, an Automatic Priority Interrupt module 5, a Programming Console 6, a Peripheral Control Input/Output Buffer module 7, and a Process Signal Input/Output Buffer module 9.

The Main Memory module 2 typically and in this case contains a random access core storage characterized by its high speed capability. Appropriate control circuitry is provided to permit interchange of information with the Arithmetic and Control Unit 1, a Drum Memory 3, and such additional Bulk Storage Memory Devices 4 as may be required for a given system.

The Drum Memory 3 is a backup storage device for the Main Memory 2. It holds instruction routines and data which can be transferred into the Main Memory 2 upon demand. The Bulk Storage Memory Devices 4 are typically magnetic disk random access storage units and/or magnetic tape storage units used for massive storage of information to which the Arithmetic and Control Unit 1 need not have high speed access but which can be transferred into Main Memory 2 upon demand as may be required.

The Automatic Priority Interrupt module 5 detects and identifies "ready" signals from Peripheral Devices 8 that require testing at relatively long intervals. A "ready" signal from a peripheral device indicates that it is physically ready to perform its normal function. For example, if a typewriter is "ready" to type, its power is on, its motor is up to speed, and it will have completed any previous request to type a character, i.e., the physical operations which occur within the typewriter to type a character will have been completed so that another character can be typed if required. The Automatic Priority Interrupt module is also used to detect signals which indicate condition changes in the controlled or monitored process. When an interrupt signal is detected, the Arithmetic and Control Unit 1 is alerted, and a program subroutine is initiated at an appropriate time by a program branch to a memory address supplied by the Automatic Priority Interrupt module to service the requesting interrupt according to its relative importance.

The Process Signal Input/Output Buffer module 9 is a communications link between the Arithmetic and Control Unit 1 and the controlled and/or monitored process input and output devices. It acts as a multiplexer for digital and analog inputs and as a multiplexer and amplifier for output signals. Signal inputs may be from contact closures, pulse generators, or measuring devices. The Arithmetic and Control Unit 1 uses the logic and equations stored in Main Memory 2 to decide whether any control or alarm actions are required. If corrective or alarm action is needed, the Arithmetic and Control Unit 1 provides the necessary information through the Process Signal Input/Output Buffer 9 to the digital and/or analog output circuits to change the process control variables or activate the proper alarm devices or displays. A plurality of Process Signal Input/Output Buffer modules may be provided to communicate with a single Arithmetic and Control Unit where the requirements of a specific system exceed the capacity of a single Process Signal Input/Output Buffer module.

The Analog Input Scanner 10 selects and amplifies process analog sensor signals. It also converts analog information into a. digital form compatible with that used within the Arithmetic and Control Unit 1 and the other system modules. The Digital Input Scanner module 11 selects and conditions (filters, amplifies, attenuates) contact or digital process inputs. The Multiple Output Distributor module 12 selects and times digital, decimal, and analog outputs to the controlled and/or monitored process and to operator displays.

The Peripheral Control Input/Output Buffer module 7 communicates with the Arithmetic Control Unit 1 and is used as a data buffer, translator, and sequencer for the various Peripheral Devices 8, which may include such Input/Output devices as typewriters, paper tape and card readers and punches, etc. A plurality of Peripheral Control Input/Output Buffer modules may be provided to communicate with a single Arithmetic and Control Unit where the requirements of a specific system exceed the capacity of a single Peripheral Control Input/Output Buffer.

The Programming Console 6 provides manual communications with the Arithmetic and Control Unit 1 in machine language for programming and maintenance. In addition, the Programming Console 6 is provided with light displays which shows the instantaneous states of various registers and elements within the Arithmetic and Control Unit 1 as an aid to monitoring the system and program performance and condition.

INFORMATION REPRESENTATION

The process computer system of FIGURE 1 stores and process information represented by the binary code in which each digit must be a "one" or a "zero." For a brief explanation of this now commonly used code, one may refer to chapter 1 of Digital Computer Design Fundamentals by Yaohan Chu, published in 1962 by the McGraw-Hill Publishing Company, Inc. The fundamental unit of information employed in the particular system described is a word of 24 binary digits. The first binary digit or bit of a word is termed the most significant bit and is designated as bit 23. The last binary digit is termed the least significant bit of the word and is designated as bit 0. The binary digits between bits 23 and 0 are accorded successively decreasing orders of significance.

Three general categories of words are employed in the system; viz: (1) data words, (2) command words, and (3) auxiliary words for addressing and control. For convenience a binary word may be more compactly represented by a series of "octal" digits in which each octal digit defines 3 adjacent binary digits. As illustrated in FIGURE 2, any decimal number between zero and seven may be represented by three binary digits so that there are eight total combinations possible, hence the designation "octal." FIGURE 3 illustrates a 24-bit word and the equivalent octal number which represents the binary word given as an example. As will be explained below, the operation codes of the various types of command words are defined by bits 23–18 of the command words. The operation codes may therefore be denoted by two octal digits. A subscript 8 placed after a number indicates octal notation. A subscript 10 placed after a number indicates decimal notation.

The Main Memory module 2 of FIGURE 1 may utilize storage elements of the coincident-current magnetic core type. A brief explanation of magnetic core storage can be found at pages 106, 107, and 108 of Digital Computer Primer by E. M. McCormick, published in 1959 by Mc-graw-Mill Book Company, Inc. For this specification, it need only be observed that words stored in the Main Memory module 2 are individually identified by a binary number which represents the address of a specific core cell or storage location in a three-dimensional magnetic core matrix where a desired information word, command word, or control word is stored. If the appropriate binary identification number or address is supplied to the Main Memory module 2, the Memory circuitry can retrieve or "fetch" the designated 24-bit word from the magnetic core storage location and make it available to the Arithmetic and Control Unit 1. The extraction of a previously stored information word from a core memory may change the magnetic state of individual cores and so destroy the information stored therein. Normal practice in the art is to provide automatic apparatus which immediately restores the same binary word in the same Memory core cell or storage location from which it has been fetched so that, in effect, extracting information from a Memory storage locations does not change the information stored there.

Memory storage location addresses are often specified in octal notation. For example, the Memory storage location address 01110110101110 is more compactly identified as $16656_8$. It will be observed that, in this example, the binary number is 14 bits in length. For this reason, the most significant octal digit can never be higher than 3. If the binary number had been 13 bits in length, the most significant octal digit could never have been higher than 1. This follows from the conventional practice of dividing the binary word into octal digits by grouping from the least significant to the more significant bits.

The command or instruction words executed by the Arithmetic and Control Unit 1 are divided into six categories: Operand, GEN 1, GEN 2, GEN 3, Quasi, and Step Floating Point (SFP). The format of each of these command types is shown in FIGURE 4. As noted above, the operation codes for all commands are defined by the six most significant bits (23–18) of the command words. The operation code identifies the specific effect to be brought about by the performance of a command or instruction.

Full Operand commands, a sub-category of Operand Commands, are the most commonly used. These commands, which are processed as if the Operand were contained by the entire word, are used to perform arithmetic operations, logical operations, index control operations, and data transfers to and from the Main Memory module 2. Bits 13–0 of these command words, the operand address portion, designate the address of the storage location in the Main Memory 2 containing information which is to be used or affected by executing the command. Bit 14 of the Ful Operand command words, if a "one" brings about a modification to the operand address known as Relative Addressing which will be described below.

GEN 1 command are differentiated from other command types by their unique operation code $05_8$. These commands are further sub-divided by the microcoding of bits 14–0 of the command word. GEN 1 commands are used primarily to effect bit manipulation within the principal accumulator register of the Arithmetic and Control Unit 1.

GEN 2 commands are differentiated from other commands by their unique operation code $25_8$. These commands are also sub-divided by the microcoding of bits 14–0 of the command word. GEN 2 commands are employed within the system to: (1) select modules and devices in the input/output equipment, (2) transfer data to or from these devices, and (3) provide for program control transfers as determined by various internal and external conditions to which the system is responsive.

GEN 3 commands are differentiated from other commands by their unique operation code $45_8$. These commands are also sub-divided by their microcoding of the bits 14–0 of the command word. GEN 3 commands are used to manipulate the contents of the principal and secondary accumulator registers and to effect other elements within the Arithmetic and Control Unit 1. GEN 3 commands are also used within Quasi subroutines for speeding up floating point arithmetic operations.

Quasi commands are identified by the presence of the number $7_8$ in bit positions 23 through 21 of the command word. These commands are utilized to initiate Quasi subroutines which perform floating point arithmetic operations or other recurring special functions. The Main Memory 2 address of the first command word in a Quasi subroutine is defined within the operation code of the appropriate Quasi command.

SFP (Step Floating Point) commands are identified by their unique operation code $01_8$. They are used within the Quasi subroutines to implement and speed up floating point arithmetic operations. Bits 14–0 of the command words are microcoded to bring about bit manipulations within the Arithmetic and Control Unit 1 of unique significance to the performance of floating point operations.

Bits 17–15 of all command words, denoted the X, or index, bits, are reserved for indicating whether conventional index modification is to be performed on a command before its execution and, if index modification is specified, which index cell contains the modifying or index quantity which is to be the modifier. If bits 17–1 of a command word are all "zeros," no index modification will occur when the command word is transferred to the Arithmetic Control Unit 1 for execution. If bits 15–17 are any other possible combination (001–111), index modification of the command word will take place by causing the contents of the designated Memory storage location ($00001–00007_8$) to be added to bit positions 15–0 of the command word. With the most often used command type, Full Operand, the result is normally a change in the operand address portion of the command word. With other command types, however, the command microcoding, and hence the operation to be performed, can be affected by index modification.

Where the total possible number of words which may be stored in the Main Memory module 2 exceeds the definition capability of that part (bits 13–0) of the Full Operand command words which specifies the operand address, a unique form of addressing is utilized to achieve extended addressing capability without increasing the fundamental word length of the information processing system. Bit 14 of Full Operand command words is reserved for specifying whether or not Relative Addressing is to be used with a command word which has been called into the Arithmetic and Control Unit 1 for execution. If bit 14 is a "one," Relative Addressing is specified, and the operand address portion of the command word will be modified arithmetically according to certain defined rules before it is executed such that the total range of addressable storage locations in the Main Memory module 2 is four times as great as that which could be specified by bits 13–0 without the relative addressing capability. If bit 14 is a "zero," Relative Addressing is not utilized, and the command word operand address is that specified directly by bits 13–0 subject to index modification as noted above.

Quasi command words can also be Relative Addressed although the result is not the same as that achieved with Full Operand command words. When a Quasi command word is executed and program control is transferred to the Memory storage location specified by the Quasi command word operation code portion, the binary number contained within the operand address portion is automatically transferred to a predetermined Memory storage location from which it can be extracted for use within the Quasi subroutine if necessary. When a Quasi command word is "Relative Addressed," the ultimate result is a change in the binary number placed into the predetermined Memory storage location rather than an actual change in an operand address per se.

ARITHMETIC AND CONTROL UNIT

FIGURE 5 is a simplified block diagram of the Arithmetic and Control Unit (henceforth, Arithmetic Unit) 1 and the registers within the Main Memory module 2 with which it is in direct communication. The block diagram indicates the functional relationship between the several registers, a Parallel Adder Unit, and three serial full adders. Transfer of information between registers and other elements of the Arithmetic Unit 1, as indicated by the interconnecting lines of FIGURE 5, is effected by parallel and/or serial transfer of binary digits from the source register or element to the receiving register or element. In the introductory description that follows, only the basic register characteristics and functions and the more usual information flow paths are discussed as a basis for more detailed and expanded disscussion of the invention as the specification progresses.

The Parallel Adder Unit (henceforth PAU) 20 is a 24-bit parallel adder with simultaneous (look-ahead) carry propagation between each group of 4 bits which may be enabled or disabled as required. For a general discussion of parallel adder units with simultaneous carry propagation capability, one may refer to pages 390 and 391 of Digital Computer Design Fundamentals by Yaohan Chu and previously referred to in this specification. All parallel arithmetic operations within the Arithmetic Unit 1 are accomplished within the PAU 20. In addition to its arithmetic function, the PAU 20 serves as a "hub" for most parallel transfers of data between the other Arithmetic Unit 1 registers.

The A Register 21 is a 24-bit accumulator for arithmetic operations and bit manipulations. It is capable of either right or left serial shifting in addition to normal, parallel, information exchange with the PAU 20. Parallel transfer of information may be effected between a portion of the A Register 21 and the J Counter 30 for floating point operations. The A Register 21 is also capable of communicating with the Q Register 22, the "F" Full Adder 27, and the "N" Full Adder 29.

The Q Register 22 is a 24-bit auxiliary accumulator used in conjunction with the A Register 21 for double precision arithmetic operations. In addition, the contents of the Q Register 22 are used to define operative fields of the A Register 21 and/or B Register 25 during the performance of Field commands, another sub-category of operand instruction words, in which only the specified fields (groups of one or more bits) of an information word are affected. The Q Register is also capable of left or right shifting and of normal parallel transfer of information to or from the PAU 20 and is capable of communicating with the "F" Full Adder 27.

The I (Instruction) Register 23 is a 26-bit register which holds the command word being executed at a given time. Two bits, A and B, are interposed between bits 14 and 13 of a standard 24-bit command word when in the I Register 23 to provide a 16-bit operand field for extended memory addressing. Information transferred to or from the I Register 23 normally moves in parallel although portions of the I Register 23 may be serially shifted under certain conditions. The I Register 23 is capable of communicating with the PAU 20, the P Register 24, the "I" Full Adder 28, the Memory Address Register 32, and the Memory Data Register 33.

The P (Program Location) Register 24 is a 16-bit register which normally specifies the address of the storage location in the Main Memory module 2 from which the next command to be executed is to be extracted. All information is transferred to and from the P Register 24 in parallel. The P Register 24 is capable of communicating with the Parallel Adder Unit 20, the I Register 23, the H Register 26, and the Memory Address Register 32.

The B Register 25 is a 24-bit parallel-entry buffer register disposed between the Main Memory module 2 and the processing registers of the Arithmetic Unit 1. All information passing to or from the storage locations in the Main Memory module 2 is routed through this register via the Memory Data Register 33. The B Register 25 is capable of being right shifted during the performance of certain commands with which the B Register 25 is utilized as a functional information processor as well as a buffer. Information is transferred between the B Register 25 and the PAU 20 in parallel. The B Register 25 is also capable of communicating with the "F" Full Adder 27, the "I" Full Adder 28, and the "N" Full Adder.

The H (Holding) Register 26 is a 16-bit register used primarily to provide temporary information storage during the execution of certain "extended function" commands. This register is capable of accepting parallel data from the PAU 20 and transferring parallel data to the PAU 20, the P Register 24, and the Memory Address Register 32.

The "F" Full Adder 27 is used to implement arithmetic and logical manipulation on fields specified by the Q Register 22 during the performance Field commands and also to update a portion of List Control Words during the execution of List commands which affect certain storage locations in specified portions of the Main Memory 2.

The "I" Full Adder 28 is used to compute, from information contained within List Control Words, the relative location of items to be removed or appended to lists stored in the Main Memory module 2 during the performance of List commands.

The "N" Full Adder 29 is used to implement arithmetic and logic manipulations of the A Register 21 and to update second and third portions of List Control Words during the performance of List commands.

The J Counter 30 is a 5-bit counter used to control information manipulation and certain aspects of timing during the execution of a number of commands which require counting in one form or another, some according to variable conditions.

The Input/Output (henceforth, I/O) Selector Hub 31 provides Arithmetic Unit communications with the Peripheral Control Input/Output Buffer 7, the Process Signal Input/Output Buffer 9, and the Programming Console 6. The I/O Selector Hub enables one of a plurality of selectable 24-bit I/O information channels during the execution of certain commands. All parallel data transfers from Input/Output devices are routed through the I/O Selector Hub 31 to the PAU 20 for further distribution within the Arithmetic Unit 1.

The Memory Address Register 32 is a 16-bit register which is an integral part of the Main Memory module 2 rather than the Arithmetic Unit 1. However, it receives a 16-bit truncated word directly from the P, I, or H Registers of the Arithmetic Unit 1, which word specifies the Memory storage address for the next stored 24-bit word which is to be transferred from Main Memory 2 into the Arithmetic Unit 1 via the Memory Data Register 33.

The Memory Data Register 33 is also an integral part of the Main Memory module 2. It is a 24-bit register which holds any word just extracted from a Memory storage location in response to a specific address having been placed in the Memory Address Register 32 and a Memory request having been made by the Arithmetic Unit 1. The Memory Data Register 33 communicates with the B Register 25 and I Register 23 of the Arithmetic Unit.

LOGIC AND LOGIC COMBINATIONS

In a fundamentally binary information processing system, any given signal representing a single bit of information must always be either true or false or, as it is more commony expressed, either "one" or "zero." Ordinarily, these states are represented within an information processor, other than as stored in Memory devices, by two discrete voltage levels. For example, a voltage level of nominally five volts positive may correspond to a binary "one" signal, and a voltage level of nominally zero volts to a binary "zero." The choice of voltage levels is arbitrary except for the consideration of using specific types of logic circuitry which may be preferred or prescribed. It is not uncommon for the two discrete voltage levels which represent "one" and "zero" conditions to be different in different logic areas of an information processing system; that is to say, a system in which "ones" and "zeros" are normally represented by five volts positive and zero volts levels respectively may include areas in which conditions requide a wider voltage disparity and, perhaps, a polarity inversion. These areas might have logic voltage levels, for example, of 18 volts negative for "ones" and six volts positive for "zeros." For these reasons, it is standard practice to explain binary logic systems in straightforward terms of "one" and "zero" conditions without excessive concern for the precise arbitrary voltages representing these conditions.

Temporary storage of a bit of information may be effected by deliberately setting a bistable device to one or the other of its stable states to represent a "one" or a "zero." The bistable device most widely used in electronic information processors is the well known "flip-flop." A flip-flop is said to be in either the "one" state or the "zero" state and has the capability of retaining a state into which it has been placed until it is operated upon and forced into its alternate state. A change of state of a flip-flop is normally brought about by applying a voltage pulse to a "set" or "clear" (sometimes called "reset") input. As a practical matter, a flip-flop is usually designed to respond to voltage transients so that a change of state occurs, according to design, on the trailing or leading edge of a voltage pulse applied to a flip-flop input.

The state of a flip-flop may be reflected in one or more outputs, and a flip-flop is usually provided with both "one" and "zero" outputs. Should a flip-flop be in the "one" or set state, the "one" output would be true and the "zero" output would be false. If positive five volts and zero volts represent "one" and "zero" signal levels within the local logic area of the system, the "one" output would be positive five volts and the "zero" output would be zero volts. On the other hand, if the flip-flop is in the "zero" or cleared state rather than set, the "one" output would be zero volts or false and the "zero" output would be positive five volts or true.

FIGURE 6*a* shows a logic symbol for a flip-flop with its input and output terminal indicated. FIGURE 6*b* is a voltage/time diagram which illustrates the response characteristics of a flip-flop to set and clear pulses applied to the appropriate input terminals.

Information requiring a plurality of bits for definition may be temporarily stored in a group of flip-flops which make up a register. Hence, a 24-bit word may be placed in a 24-bit register, and the state of each flip-flop in the register may be ascertained by observing the voltage levels at the individual "one" and "zero" outputs. The flip-flops of a register may be interconnected to permit serial shifting of the information bits in unison to the next higher order or next lower order bit position relative to each. A brief explanation of serial shifting may be found on pages 95 and 96 of Digital Computer Primer by E. M. McCormick and previously referred to in this specification. Entry of information into a register may be performed serially or in parallel to each individual flip-flop in unison. The flip-flops of a register may also be interconnected such that the register functions as a counter to accumulate intermittent pulses from one or more pulses.

Movement of information between the registers of an information processor and many other related functions are performed in relative synchronism. A common time base generator is therefore required; and this conveniently may be a stable oscillator and a suitable waveshaping circuit to produce a train of regular, rectangular pulses often designated the "Clock." The "one" and "zero" positions of a Clock pulse train may be time symmetrical or asymmetrical as may be appropriate for the system which it governs. FIGURE 7*a* is a block representation of a Clock Generator 35, and FIGURE 7*b* is a diagram showing the time and voltage dimensions of a 2.94 megacycle Clock signal suitable for use in an information processing system with which the present invention may be practiced.

Generally, two or more output signals from flip-flops and/or other bistable devices such as switches are combined logically, sometimes with and sometimes without a Clock or other timing signals, by "gates" to provide input signals to other flip-flops and to provide gating signals which are logically combined with binary information signals to control information movement within the system, both as to path and as to relative time.

A gate has a single output which reflects logically the instantaneous state of its inputs. These inputs may, for logical design purposes, be any number required. Gates with certain distinctive characteristics are conventionally designated AND gates, OR gates, NAND gates, NOR gates, and NOT gates. Gates are represented in logic diagrams by standard symbols according to their characteristics, which characteristics may be summarized in a truth table for each type of gate. For example, a logic notation symbol of a two-input AND gate and its truth table are shown in FIGURES 8*a* and 8*b*, respectively. It will be observed that only when inputs A and B are both "ones" will the output W be a "one." If one or more of the inputs should change to "zero," the output would switch to "zero."

FIGURE 9*a* shows a logic notation symbol for a two-input OR gate and FIGURE 9*b* its truth table. It will be observed that if one or the other or both the inputs F and G is "one" then the gate output will be "one." If the inputs are all "zeros," the output X will be "zero."

Equivalent logic notation symbols and their corresponding truth tables for NAND and NOR gates are shown in FIGURES 10*a* and 10*b* and 11*a*, 11*b*, respectively.

Another element widely used in binary logic networks is the logical inverter which has a single input and a single output and, as its name implies, converts a "one" input to a "zero" output and a "zero" input to a "one" output. A logic notation symbol and truth table for the logical inverter are shown in FIGURES 12*a* and 12*b*. The logical inverter is also known as the NOT gate.

A three-input, four-output logic element known in the art as a "full adder" is represented by the logic notation symbol shown in FIGURE 13*a*. The characteristics of a full adder are summarized in a table presented in FIGURE 13*b*. The S and $\overline{S}$ outputs are complementary "sum" signals, and the C and $\overline{C}$ outputs are complementary "carry" signals. Full adders are used, often in conjunction with "carry" flip-flops, to perform binary arithmetic. It may be observed that the full adder characterized in FIGURE 13*b* "adds" in response to "zero" inputs rather than "one" inputs. This is merely a matter of circuit preference, and full adders responding to "one" inputs are also well known in the art.

In order to achieve meaningful and orderly movements of information between the various registers and other elements of an information processor, after a need for specific movements and combinations of movements has been established, gating signals must be generated or issued which permit the prescribed movements of information at the desired time and inhibit any undesirable movements of information at the same time. The exact manner in which a specific signal may be generated according to precisely defined conditions within a computer system at certain precisely defined times has become a matter of common knowledge within the art. Generally speaking, a signal issues, usually as a gate output, when all requisite conditions are satisfied in its logic chain. The conditions in a chain are themselves represented by other signals which may be individually dependent upon a higher order logic chain relative to the specific signal of interest. Alternatively, it is manifest that these higher order logic chains can simply be considered elements of the total set of conditions upon which the issuance of the ultimate signal depends. The origin of a given signal can thus be traced back to a unique set of conditions each of which depends upon the state of a bistable device at a given instant of time and which may or may not be logically combined with timing signals such as a Clock.

A unique mnemonic designation is conventionally assigned to each unique signal within a binary information processing system. In the present system, signals are identified by four character mnemonic designations. The Clock, for example, is designated TCKA. Following standard logic notation practice, a signal designated $\overline{\text{TCKA}}$ is the logical inversion of TCKA as indicated by the bar over the mnemonic. Whenever TCKA is "one," $\overline{\text{TCKA}}$ must be "zero"; and whenever TCKA is "zero," $\overline{\text{TCKA}}$ must be "one."

The set of conditions which must be fulfilled for a given signal to be "one" may be expressed by the classical logic or Boolean equation. The use of Boolean algebra to represent binary logic combinations has become so universally known and practiced in the art that it need not be discussed at length here. An elementary treatment, adequate for an understanding of this specification, may be found in Appendix A of Digital Computer Primer by E. M. McCormick, previously referred to in this specification. For a more extended discussion of Boolean algebra and its use in logical design, one may see chapters 3 and 4 of Digital Computer Design Fundamentals by Yaohan Chu and previously referred to in this specification.

It is of some importance to understand that what is commonly and conventionally designated a "signal" in a binary information processor is often conceptually both a signal and an electrical point where the signal is represented as a function of time by one of two discrete voltage levels. For this reason, a logic equation wherein a given signal is expressed in terms of other signals also defines the orientation and interconnection of logic elements, such as gates and inverters, by which the signal is generated. As an example, assume that a combination of logic elements is to produce a "one" output signal when either one, but not both, of two input signals A and B is "one." Further, assume a restriction to the use of AND gates, OR gates, and NOT gates to achieve the desired result.

A logic element combination that meets these requirements and restrictions is presented in FIGURE 14. If a "one" signal is present at either A or B, but not both, a "one" output will be realized at X, the output from AND gate 42. The AND gate 40 is not enabled since one or the other of its two enabling requirements has not been met, and, as a consequence, its output C is "zero." The NOT gate 41 converts this "zero" signal to a "one" signal at point D to enable one input of the AND gate 42. The OR gate 43 is enabled since it will respond to a "one" signal at either A or B to produce a "one" signal at E which enables the remaining input of the AND gate 42. If "one" signals are present at both A and B, a "zero" signal will appear at point X. The AND gate 40 will produce a "one" output at C since both its input signals are "one"; the NOT gate 41 will therefore produce a "zero" output at point D to disable one input of the AND gate 42. If "zero" signals are present at both A and B, a "zero" output will appear at point X. The OR gate 43 will be disabled since neither of its inputs is "one." The OR gate 43 will therefore produce a "zero" output at point E to disable one input of the AND gate 42.

The logic combination shown in FIGURE 14 is sometimes referred to as an EXCLUSIVE OR gate because of its one-or-the-other-but-not-both characteristic. The logical relationship of the signals employed in FIGURE 14 are defined by the equation $C=A\overline{B}+\overline{A}B$ which is read, according to conventional Boolean notation discussed in the above-cited references, as: C must be "one" when A but not B is "one" or when B but not A is "one."

If NAND gates are used, the logic element combination of FIGURE 15 will function in the same logical manner as that shown in FIGURE 14. The NAND gate 44 of the FIGURE 15 combination performs the functions of both the AND gate 40 and the NOT gate 41 of the FIGURE 14 combination.

The means by which a skilled logical designer, who is aware of which logic elements are available and of their characteristics, can determine the exact logic elements and exact interconnection required for a logic chain ending in a signal which has been defined by a logic equation is explained at length in many standard texts. One may refer to chapter 3 and, particularly chapter 4 of Digital Computer Design Fundamentals by Yaohan Chu and previously referred to in this specification. It is readily apparent from the above that the creation of a unique control signal defined in terms of other control and timing signals is well known in the art and no further explanation will be given here. In describing the invention, the more important control signals are defined in terms of their characteristics, and their origin is shown in blocks designated Instruction Decoding, Gating Signal Generation, and Timing.

TIMING AND NORMAL SEQUENCE CONTROL STATES 1 AND 2

To maintain an orderly and efficient succession of operations within the Arithmetic Unit 1, Sequence Control logic 50 provides five mutually exclusive Sequence Control States which are defined by five Sequence Control Flip-flops designated FlSC01, FlSC02, FlSC03, FlSC04, and FlSC05 as shown in the Timing Block Diagram of FIGURE 16.

The Sequence Control State 1 Flip-flop FlSC01 defines the "fetch" cycle for all commands. The fetch cycle is that period during which a command stored in Main Memory 2 is requested, is transferred from Main Memory 2 to the Arithmetic Unit 1, and is routed into the I Register 23. In addition, the count in the P Register 24 is usually incremented during Sequence Control State 1, and other information movement among the registers may occur. A few commands which can be completed by a simple group of operations are completely executed during Sequence Control State 1. Relative Addressing, when specified by bit 14 of the command word, also occurs during Sequence Control State 1. Timing signal SC1A is "one" when the Sequence Control State 1 Flip-flop FlSC01 is set.

The Sequence Control State 2 Flip-flop FlSC02 defines the sequencing cycle when index modification occurs. In addition, Sequence Control State 2 is entered during the performance of several commands that utilize the X bits (17–15) of a command word for purposes other than normal index modification. Sequence Control State 2, when required, is normally entered immediately following Sequence Control State 1. Timing Signal SC2A is "one" when the Sequence Control State 2 Flip-flop FlSC02 is set.

The Sequence Control State 3 Flip-flop FlSC03 is used to provide additional bit manipulation time for a number of commands under certain conditions prior to further execution. The time extent of Sequence Control State 3 is determined by the requirements of the individual commands. Timing signal SC3A is "one" when the Sequence Control State 3 Flip-flop FISC03 is set.

The Sequence Control State 4 Flip-flop FISC04 defines the final execution state for most commands. Sequence Control State 4 is entered following Sequence Control States 1, 2, or 3 depending on the nature of the command being executed. Like Sequence Control State 3, Sequence Control State 4 may be time-extended as required for individual commands. Timing signal SC4A is "one" when the Sequence Control State 4 Flip-flop FISCO04 is set.

The Sequence Control State 5 Flip-flop FISCO05 defines a time period necessary for performing additional functions required to complete the execution of a few commands. Timing signal SC5A is "one" when the Sequence Control State 5 Flip-flop FISC05 is set.

The timing control signals required for optimum operation within each Sequence Control State and for insuring timely changes from one Delay Control State to another are generated by a Sequence Time Counter 51 and a Sequence Time Counter 52 in conjunction with the Clock signal TCKA provided by the Clock Generator 35. In FIGURE 20 and subsequent timing diagrams, the Clock signal TCKA is drawn symmetrically for convenience rather than asymmetrically as in FIGURE 7B. The Sequence Time Counter 52 comprises three flip-flops: FITCSA, FITCSB, and FITCSC. The timing signals decoded from the Sequence Time Counter 51 are tabulated in FIGURE 17 along with the logic equations for the counter advancing pulses which are developed in the logic immediately associated with the Sequence Time Counter 52.

The Delay Time Counter 51 comprises five Flip-flops: FITAFF, FITBFF, FITCFF, FITDFF, and FITEFF. It is used to provide special control signals during the execution of commands requiring extension of the normal durations of Sequence Control States 3 and/or 4. The Delay Time Counter 51 is preset during Sequence Control States 3 and/or 4 of these commands to a count less than $30_8$ and is then incremented by the Clock signal TCKA. During all other Sequence Control States, the Delay Time Counter 51 is preset to $30_8$ and is inhibited from being incremented. A Delay Time Counter Complete signal TP13 becomes "one" when the Delay Time Counter 51 count reaches $30_8$ and the Sequence Time Counter 52 is in the TT4E state. When this condition is attained, a Last Pulse signal TLPS is generated coincident with TCKA. The trailing edge of signal TLPS during any Sequence Control State clears the Sequence Time Counter 52, and the timing cycle for the next Sequence Control State is entered. At the trailing edge of signal TLPS of the final Sequence Control State for the execution of any command, Sequence Control State 1 is re-entered to initiate execution of the succeeding command.

The primary function of Sequence Control State 1 is to bring a command stored in Memory at an address specified by the contents of P Register 24 into the Arithmetic Unit 1 so that it may be decoded and executed. In addition, the P Register 24 is normally incremented during Sequence Control State 1 so that it will contain the address of the next command to be executed if the normal program sequence is followed. It may be noted here that certain conditions or commands can dictate a deviation from the straight instruction sequence provided by the P Register 24.

The primary purpose of Sequence Control State 2 is to implement conventional index modification when bits 15, 16, and 17 of a command word being executed are not all "zeros". This condition will have been detected during TCTA time of Sequence Control State 1 and appropriate signals generated so that Sequence Control State 2 is entered at the end of Sequence Control State 1.

The signals generated and the information flow scheme which takes place during Sequence Control States 1 and 2 is identical or nearly so for all commands. FIGURES 18 and 19 are block diagrams which indicate the information flow paths established during normal Sequence Control States 1 and 2, respectively; and FIGURE 20 is a timing diagram of the important gating signals which permit the proper paths to be established. In addition, the normal timing signals utilized within every Sequence Control State are included in the timing diagram of FIGURE 20.

The operation and function of normal Sequence Control States 1 and 2 may best be understood by considering the following description in conjunction with FIGURES 1, 5, 18, 19, 20, and 21. FIGURE 21 is a block diagram showing the logic areas of the Arithmetic Unit 1 from which the more important signals issue.

It should be noted that the Main Memory module 2 operates asynchronously with the Arithmetic Unit 1. To fetch a stored command word, Sequence Control State 1 is entered, and the Main Memory module 2 is alerted that a request is being made by the MREQ signal as shown in the timing diagram FIGURE 20. Simultaneously the contents of the P Register 24 are gated to the Memory Address Register (MAR) 32 by the MAMP signal. The contents of the specified storage location in the Main Memory module 2 are fetched and placed into the Memory Data Register (MDR) 33 by the Main Memory module 2 logic functioning independently from the Arithmetic Unit 1. When the requested word is available from the Memory Data Register 33, the Main Memory module 2 generates a Data Ready signal CDRA to the Arithmetic Unit 1; and, during TCT2 time, the contents of the Memory Data Register 33 are gated to the B Register 25 by the BDOB signal. Additionally, Memory Data Register 33 bits 23–14 are gated to the I Register 23 bit positions 23–14 by the IDOC signal so that operation code decoding may commence. During TCTA time, B Register bits 13–0 are gated to bit positions 13–0 of the PAU 20 by the UBLA signal. At the trailing edge of signal TLPS during Sequence Control State 1, bits 15–0 of the PAU 20 are gated to bit positions A, B, 13–0 of the I Register 23 by the IAUI signal and to the H Register 26 by the HAUH signal.

Normal incrementation of the P Register 24 also occvures during Sequence Control State 1 and is brought about in the following manner without disturbing the information flow between the various Arithmetic Unit 1 elements. During TCTS time, the contents of the P Register 24 and a count of one are simultaneously gated to the PAU 20 by the UPAU and UENC signals, respectively. The output signals from the PAU 20 at this time represents the desired sum, $P+1$. This sum is gated to the H Register 26 by the HAUH signal which occurs during TCT2 time. At the trailing edge of signal TLPS, the contents of the H Register 26 are gated to the P Register 24 by the signal PXHP as the output signals from the PAU 20 bit positions 15–0 are gated to the H Register by the HAUH signal.

Thus, at the end of a normal Sequence Control State 1, the I register 23 contains the command which has been requested from Main Memory module 2, the P Register 24 count has been incremented by one, the operand address portion of the fetched command word is in the H Register 26 and the next required Sequence Control State may be entered to continue the execution of the command. It will be observed that the operation code portion of the command word is in the I Register 23 during TCTA time of Sequence Control State 1, and appropriate control signals generated from instruction decoding become available at that time to influence: (a) the remainder of Sequence Control State 1 (as required for a very few commands), (b) the Sequence Control State which will be entered next following signal TLPS, and (c) the action to be taken during the succeeding Sequence Control States.

Assuming that bits 17–15 of the command word of the instruction being executed are not all "zeros," Sequence Control State 2 will be entered following Sequence Control State 1. The signal MREQ again becomes "one" to indicate a request to the Main Memory module 2. Simultaneously, the contents of the I Register 23 bit positions 17–15 are gated to the Memory Address Register 32 bit positions 2–0 by the MAMX signal to specify the memory storage location indexing quantity is to be fetched. This is conveniently one of the low order memory storage locations 00001 to $00007_8$; therefore, the higher order bit positions of the Memory Address Register 32 are simply cleared by the MAMX signal. When the CDRA signal indicates that the requested modifying data is available from the Memory Data Register 33, its contents are gated to the B Register 25 by the BDOB signal during TCT2 time. During TCTA time, the contents of the B Register 25 are gated to the PAU 20 by the UBLA and UBUA signals. Simultaneously, the contents of the I Register 23 bit positions A, B, 13–0 are also gated to the PAU 20 by the UIAU signal. The output signals from the PAU 20 then represent the sum of the operand address portion of the command word present in the I Register 23 and the modifying word or index quantity stored in the specified index core cell. At the trailing edge of signal TLPS, the sum is gated from the PAU 20 bit positions 15–0 to the I Register 23 bit positions A, B, 13–0 by the IAUI signal, and the sequence control timing enters the next Sequence Control State according to the requirements of the individual command temporarily stored in the I Register 23. A few commands which affect or test the index cells use the index bits for instruction control and do not change the operand address portion of the command word.

In the following detailed description of the present invention, the assumption is made that the exemplary commands are not indexed in order that the timing charts do not become unnecessarily complex. It is to be understood, of course, that these commands can be index-modified in the manner just described.

CIRCULAR LISTING

FIGURES 22*a* and 22*b* are diagrams representing a fixed length block of memory storage locations. The first word of the block is reserved for a List Control Word represented as stored in Memory storage location Z where Z is an arbitrary address for this example. The address Z serves as the label for an entire circular list associated with this block of Memory storage locations.

The List Control Word contains several fields whose functions and characteristics will be discussed in general immediately below and in additional detail in conjunction with the explanations of four List Commands which can be executed to affect a circular list. The format of the List Control Word is illustrated in FIGURE 22*a*. The maximum length, i.e., the size of the reserved Memory block, of any given list is defined in an "L" Field (bits 3–0) of the List Control Word for that list. List length is expressed as $2^L$ where L is the number contained within the List Control Word bits 3–0. In the present embodiment of the invention, L must be within the range $1 \leqq L \leqq 9$. Bit 4 of the List Control Word is a "List Empty" Field and is "one" only if the list is currently empty; i.e., no words or items are stored in the memory storage locations of the List Control Word's list. Bit 5 of the List Control Word is a "List Full" Field and is a "one" only if the list is currently full as determined by the maximum list length defined by the "L" Field. The "N" Field (bits 14–6) of the List Control Word signifies directly the number of items currently in the list. The "F" Field (bits 23–15) of the List Control Word specifies the address of the Memory storage location available for an "Enterable Beginning Item" expressed relative to Memory storage location $Z+1$. F must fall within the range $0 \leqq F \leqq 2^L - 1$.

By addressing Memory storage location Z from the operand address portion of any of the four List Commands to be described in detail below, a selected one of four Memory storage locations can be affected within the block of memory storage locations defined in the "L" Field of the List Control Word stored in memory storage location Z. These four Memory storage locations are called The Removable Beginning Item, The Enterable Beginning Item, The Removable Ending Item, and The Enterable Ending Item. The specific Memory address locations which serve as these "items" are dynamically rather than statically located; i.e., as information items are appended to or removed from a circular list, the beginning and ending of the occupied and vacant portions of the list changes accordingly but is always specified by the List Control Word to the extent necessary for execution of the List commands.

The Circular List illustrated in FIGURES 22*a* and 22*b* is shown as partly occupied and partly vacant to show the normal relationship of the various items to one another and to the whole of the block of Memory storage locations reserved for the list. The Removable Beginning Item and the Enterable Beginning Item always occupy adjacent Memory storage locations. In a like manner, the Removable Ending Item and the Enterable Ending Item occupy adjacent Memory storage locations. The Memory storage address of the Removable Beginning Item is always $Z+1+(F+1)$ in some form of variable modulo arithmetic such as modulo $2^L$ arithmetic where F is the number contained within the "F" Field of the List Control Word and Z, as noted above, is the actual Memory address of the List Control Word. The address of the Enterable Beginning Item is always $Z+1+(F)$. Similarly, the address of the Removable Ending Item is always $Z+1+(F+N)$, N being the number of items currently stored within the list as specified by the "N" Field of the List Control Word. The address of the Enterable Ending Item is $Z+1+(F+N+1)$.

The following four independent Full Operand List commands are decoded to provide the signals necessary to add items to or remove items from a circular list and to appropriately modify the List Control World. An APPEND ITEM TO BEGINNING OF LIST command is arbitrarily assigned the mnemonic designation ABL and the Operation Code $57_8$. In response to the ABL command, the addressed List Control Word is transferred from the Main Memory module 2 to the Arithmetic Unit 1. If bit 5 of the addressed List Control Word is a "zero" (list not full), the word or item in the A Register 21 is appended to the list in the appropriate Memory storage location representing the Enterable Beginning Item to become the new Removable Beginning Item. The "N" Field of the List Control Word is incremented by a count of one to reflect the new current number of items in the list, and the "F" Field is decremented by a count of one to specify the new address of the Enterable Beginning Item of the list. If the list becomes full with this operation, bit 5 of the List Control Word is set to "one." The modified List Control Word is then restored to its appropriate storage location in Main Memory 2 and program control is transferred to the second sequential location from that in which the ABL command is stored. If bit 5 of the List Control Word is a "one" (list full) when the List Control Word is transferred to the Arithmetic Unit 1, the ABL command is not executed. Program control, in this case, is transferred to the first sequential location following that in which the ABL command is stored. Neither the modified List Control Word nor the contents of the A Register 21 are stored if the list is already full.

An APPEND ITEM TO END OF LIST command is arbitrarily assigned the mnemonic designation AEL and the Operation Code $47_8$. In response to the AEL command, the addressed List Control Word is transferred from the Main Memory module 2 to the Arithmetic Unit 1. If bit 5 of an addressed List Control Word is a "zero" (list not full), the item or word in the A Register 21 is appended in the appropriate Memory storage location representing the Enterable Ending Item to become the new Removable Ending Item, and the "N" Field of the List Control Word is incremented by a count of one. The addresses of the Beginning Items remain the same; thus the "F" Field of the List Control Word is not modified. If the list becomes full, bit 5 of the List Control Word is set to a "one." The modified List Control Word is then restored to its appropriate storage location in Main Memory 2, and program control is transferred to the second sequential location from that in which the AEL command is stored. However, if bit 5 of the List Control Word is a "one" (list full) when the List Control Word is called into the Arithmetic Unit 1, the AEL command is not executed. Program control, in this case, is transferred to the first sequential location following that in which the AEL command is stored. Neither the modified List Control Word nor the contents of the A Register 21 are stored if the list is already full.

A REMOVE BEGINNING ITEM FROM LIST command is arbitrarily assigned the mnemonic designation RBL and the Operation Code $56_8$. In response to the RBL command, the addressed List Control Word is transferred from Main Memory 2 to the Arithmetic Unit 1. If bit 4 of an addressed List Control Word is a "zero" (list not empty), the Removable Beginning Item of the list is fetched from Main Memory 2 and placed in the A Register 21. The "N" Field of the List Control Word is decremented by a count of one to reflect the new number of items in the list and the "F" Field is incremented by a count of one to specify the new address of the Enterable Beginning Item of the list. Bit 4 of the List Control Word is set to "one" if the list is emptied by the execution of this instruction. The modified List Control Word is restored in Main Memory 2, and program control is transferred to the second sequential location from that in which the RBL command is stored. However, if bit 4 of the List Control Word is a "one" (list empty) when the List Control Word is called into the Arithmetic Unit 1, the RBL command is not executed. Program control is transferred to the first sequential location following that in which the RBL command is stored. The modified List Control Word is not stored, and the contents of the A Register 21 are not changed if the list is already empty.

A REMOVE ENDING ITEM FROM LIST command is arbitrarily assigned the mnemonic designation REL and the Operation Code $46_8$. In response to the REL command the addressed List Control Word is transferred from Main Memory 2 to the Arithmetic Unit 1. If bit 4 of an addressed List Control Word is a "zero" (list not empty), the Removable Ending Item of the list is fetched from Main Memory 2 and placed in the A Register 21, and the "N" Field of the List Control Word is decremented by a count of one to reflect the new number of items in the list. The "F" Field is not modified because the Enterable Beginning Item address does not change. Bit 4 is set to "one" if the list is emptied by the execution of this instruction. The modified List Control Word is restored in Main Memory 2, and program control is transferred to the second sequential location from that in which the REL command is stored. However, if bit 4 is a "one" (list empty) when the List Control Word is called into the Arithmetic Unit 1, the REL command is not executed. Program control is transferred to the first sequential location from that in which the REL command is stored. The modified List Control Word is not stored, and the contents of the A Register 21 are not changed if the list is already empty.

A table summarizing the modifications to the "F" and "N" Fields of List Control Words upon the successful execution of the ABL, AEL, RBL, and REL commands and the Memory storage location affected by each, relative to the address Z of the List Control Word, is presented in FIGURE 22*c*.

It is noted that upon successful execution of each of these instructions, program control is transferred to the second sequential Memory storage location from that in which the executed command is stored. If the list condition, full or empty, is such that additional words cannot be appended or extracted, as the case may be, program control is transferred to the first sequential location from that in which the executed command is stored. A programmer, cognizant of these characteristics, may therefore insert appropriate instructions into both the first and second sequential locations to direct a running program according to the successful or unsuccessful appendage or removal resulting from the execution of a List Command.

To aid in understanding the exact Memory storage location affected by each of the List commands, to clarify the terms Enterable Beginning Item, Removable Beginning Item, Enterable Ending Item, Removable Ending Item, and to illustrate the circular nature of a circular list, example operations on a short list are provided with reference to FIGURES 22*C* and 23 through 31. It will be appreciated, of course, that, in a running program, these commands may be executed in a pseudorandom order with the many other commands of the program. For simplicity however, the List commands are considered one after the other. The order of their execution is wholly arbitrary since each command is fully independent.

Figure 23:
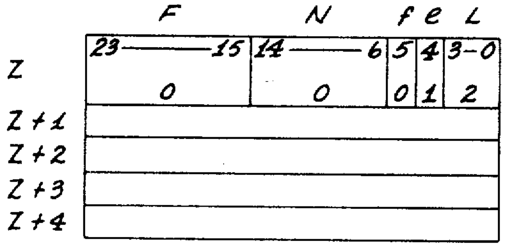

Consider that prior to a first step, the example list format is as illustrated in FIGURE 23. As indicated by bit 4 of the List Control Word stored in Memory storage location Z, the list is empty, the maximum number of items that may be contained in the list as specified by the "L" Field is 4 ($2^2$), and the Memory storage address for an Enterable Beginning Item is Z+1, the "F" Field Count being zero. Because of the maximum length of four of the list in this example, only bits 15 and 16 of the "F" Field and only bits 6 and 7 of the "N" Field are utilized in the computation of item addresses.

Figure 24:
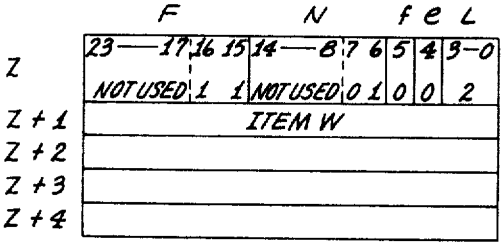

Assume that an ABL command having the operand address Z is executed to transfer an item "W" from the A Register 21 to the Enterable Beginning Item of the list. The actual Memory storage location affected is $Z+1+(F)$ which, in this instance, is simply $Z+1$ since the "F" Field contains a count of zero. After execution of the ABL command, the list format will be as illustrated in FIGURE 24 where the item W is depicted as stored in Memory storage location $Z+1$. The "N" Field has been incremented by a count of one to indicate a total of one item currently stored within the list. The "F" Field has been decremented by a count of one, and it will be observed that the previously all "zeros" "F" Field has become all "ones" for reasons to be explained in detail below. Bits 15 and 16 can be considered as set to either $-1$ or $+3$; however, they are utilized as a $+3$ count as the next step will illustrate.

Figure 25:
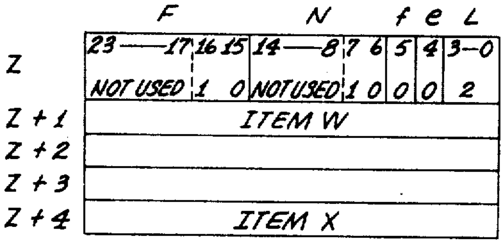

Now consider a second step in which a second ABL command having the operand address Z is executed to append a second item, X, to the Enterable Beginning Item of the list. The actual storage location affected is $Z+1+(F)$ or $Z+4$. After execution of the ABL command, the list format will be as illustrated in FIGURE 25. It will be observed that the "F" Field has been utilized as a $+3$ count in determining the core cell ($Z+1+F = Z+4$) in which item X has been stored. In the modified List Control Word, as illustrated, the "F" Field has been decremented by a count of one and the "N" Field has been incremented by a count of one to represent the current status of the list.

Figure 26:
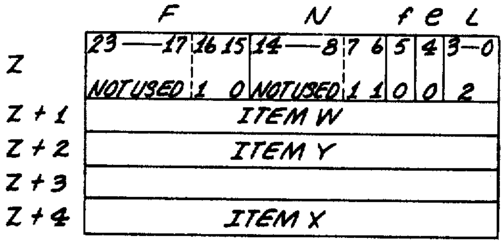

Next, consider a third step in which an AEL command having the operand address Z is executed to transfer a third item, Y, into the Enterable Ending Item of the list. The nominal computation of the storage location affected is $Z+1+(F+N+1)=Z+1+(2+2+1)=Z+6$ or $Z+(110)_2$. However, the "L" Field limits the actual computation to the reserved Memory storage block, and where the count to be added to the address Z exceeds four in this example, the excess of four is disregarded such that the Memory storage location affected in this step is $Z+2$ rather than $Z+6$, the latter being outside the block. After executing the AEL command, the list format will be as illustrated in FIGURE 26 where it may be observed that item Y has been stored in Memory storage location $Z+2$. The "F" Field of the List Control Word has not been modified during the execution of this command because the Enterable Beginning Item address has not changed. The "N" Field is again incremented by a count of one to reflect the current number of items in the list.

Figure 27:
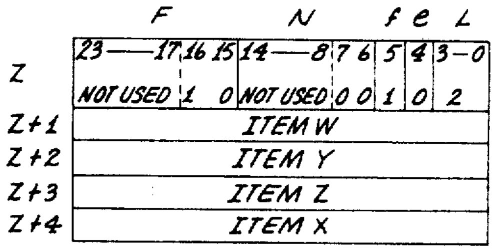

Now consider a fourth step in which another AEL command having the operand address Z is executed to transfer a fourth item, Z, into the Enterable Ending Item of the list. Again, the nominal computation of the storage location affected is $Z+1+(F+N+1)$ which now equals $Z+1+(2+3+1)=Z+7$ or $Z+(1011)_2$. As explained for the previous step, the influence of the "L" Field causes Memory storage location Z+3 to be that affected. After execution of the AEL command, the list format would be as illustrated in FIGURE 27. Because this operation fills the list, bit 5 of the modified and restored List Control Word is now set to a "one." In addition, it may be observed that an ABL command would have affected the same Memory storage location, $Z+3$ from the computation $Z+1+(F)=+3$ and would also have caused bit 5 of the List Control Word to be set. Since the list is now full, any further attempt to append an item to either the beginning or the end of the list would cause the transfer of program control to a subroutine provided by the programmer for this contingency. This subroutine would recognize the failure of the attempt and initiate appropriate action. The "N" Field is incremented by a count of one, but the significant bits 7 and 6 become "zeros" with a carry into bit 8 which is disregarded because of the control exercised by the "L" Field.

Figure 28:
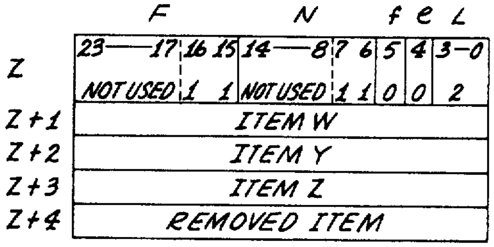

Next, consider that an RBL command is executed to remove the Removable Beginning Item from the list and place it in the A Register 21. After execution of the RBL command, the list format would be as illustrated in FIGURE 28. It will be observed that the removed item is taken from Memory storage location $Z+4$, the Removable Beginning Item specified by the List Control Word before its modification computed from $Z+1+(F+1)$. After modification, the "F" Field of the List Control Word has been incremented by a count of one and the "N" Field decremented by a count of one to reflect the current status of the list. In addition, bit 5 has been cleared to indicate that the list is no longer full.

Figure 29:
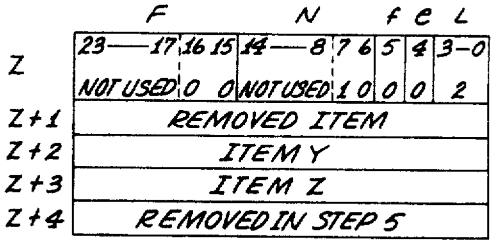

Now consider that another RBL command has been executed to again remove the Removable Beginning Item from the list. The nominal computation of the Memory storage location affected is $Z+1+(F+1)=Z+(101)_2$. However, as previously mentioned, the "L" Field limits the effect of the List commands to the reserved Memory block such that the excess of four is disregarded and the actual Memory storage location affected is $Z+1$ rather than $Z+5$. After execution of the RBL command, the list format would be as illustrated by FIGURE 29. The "F" Field has again been incremented by a count of one and the "N" Field decremented by a count of one. The incrementation of the "F" Field has resulted in a carry into bit 17 of the List Control Word and the clearing of bits 16 and 15. This again illustrates the inherent circular characteristic of the list since bit 17 is not considered in the computation of the address of a Removable or Enterable Beginning Item so long as the maximum list length remains at four items.

Next, consider that an REL command is executed to remove the Removable Ending Item from the list. The actual Memory storage location affected is $$Z+1+(F+N)=Z+3$$

Figure 30:
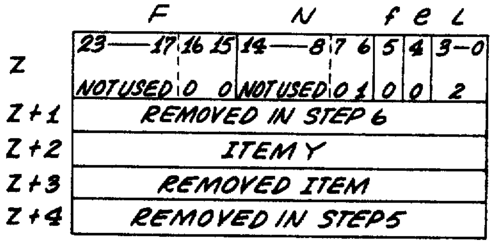

After execution of the REL command, the list format would be as illustrated in FIGURE 30 where it will be seen that item Z has been removed from Memory storage location $Z+3$, the "F" Field has not been altered, and the "N" Field has been decremented by a count of one to reflect the current status of the list.

Figure 31:
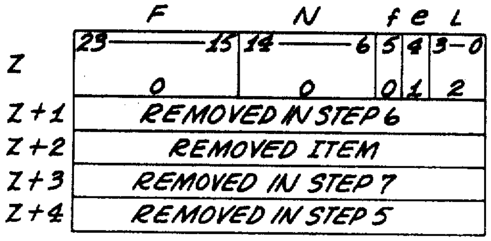

Finally, consider that another REL command has been executed to again remove the Removable Ending Item from the list. The actual Memory storage location affected is $Z+1+(F+N)=Z+2$. After execution of the REL command, the list format would be as illustrated in FIGURE 31. Item Y has been removed from the Memory core cell $Z+2$, the "F" Field has not been modified, the "N" Field has been decremented by a count of one to a total count of zero, and bit 4 of the List Control Word has been set to "one" to indicate that the list is once again empty.

It will be understood, of course, that there is no requirement that the list be filled before the first removal command can be executed nor that the list be empty before the first appendage command can be executed. The sequence just described is merely convenient for this example.

The realization of these operations is achieved by the provision of "F," "N," and "I" Full Adders of the type with logic characteristics previously tabulated in FIGURE 13B. Each Full Adder is provided with a Carry Flip-Flop which may be preset if required. Control logic structure associated with the Full Adders is provided to bring about bit manipulations appropriate for the execution of each List command as more fully explained below and illustrated in FIGURES 37 and 38.

Sequence Control State 1 of a List command proceeds in the normal manner described in detail above. Therefore, at the end of Sequence Control State 1 for any one of these commands, the I Register 23 will contain the command word, the H Register 26 will contain the operand address portion of the command which specifies the Memory storage address Z of the List Control Word for the circular list to be altered, and the contents of the P Register 24 will have been incremented by a count of one. In addition to the previously described normal Sequence Control State 1 operations, it may be observed that the "F," "I," and "N" Carry Flip-Flops (24A, 28A, and 29A respectively) are cleared as a matter of course by the trailing edge of the SC1A signal which is an input to OR gates G140, G172, and G204 as shown in FIGURES 37 and 38.

Assuming that index modification is not specified, Sequence Control State 3 is entered following the completion of Sequence Control State 1 for a List Command; and it is during Sequence Control State 3 that the critical tests and bit manipulations for execution of the List commands are performed.

During Sequence Control State 3, certain manipulations are carried out which are common to all the List commands. Referring to the timing diagrams of FIGURES 32, 33, 34, and 35, it will be observed that the Delay Time Counter 52 is preset to $17_8$ by applying the TP17 signal, which is "one" during TTIE time of Sequence Control State 3, to the clear input of FITAFF and to the set inputs of F1TBFF–F1TEFF, illustrated in FIGURE 16. This results in the extension of Sequence Control State 3 because the generation of TLPS is delayed for nine TCKA pulses. During the whole of Sequence Control State 3 for the execution of any List command, the MAMI signal is "one" such that the Memory Address Register 32 is provided with the operand address of a List Control Word from the I Register 23. When the List Control Word is available from the Memory Data Register 33, it is gated to the B Register 25 by the BDOB signal which becomes "one" during TCT2 time. The List Control Word immediately also appears in the PAU 20 because the UBUA and UBLA signals are held at "one" during the whole of Sequence Control State 3 to gate the contents of the B Register 25 to the PA 20. During TCT3 time, the "ones" complement of the "L" Field of the List Control Word is gated from the PAU 20 to the J Counter 30 by the JNUJ signal as shown in FIGURE 36. The bit position 4 Flip-Flop of the J Counter 30 is always set by the JNUJ signal when that signal is "one" during Sequence Control State 3 for the List commands.

After these operations and at the beginning of TT4E time for Sequence Control State 3 of all List commands, the List Control Word is contained within the B Register 25, the Delay Time Counter 52 has been preset to $17_8$, the J Counter 30 has been set to the "ones" complement of the binary number contained in the "L" Field, bits 3–0, of the List Control Word, the I Register 23 contains the List command being executed, the H Register 26 contains the Memory storage location address of the List Control Word, and the PAU 20 output signals represent the List Control Word because the UBUA and UBLA signals are held at "one."

Modification to the List Control Word always takes place during Sequence Control State 3 of a List command. As previously mentioned, the modifications which occur during execution of an ABL command are a subtraction of one count from the "F" Field, an addition of one count to the "N" Field, and bit 5 must be set if the list becomes full with the execution of the instant ABL command. For reasons which will become more apparent below, the unmodified "F" Field is also shifted to the I Register 23 bit position 8–0. In addition, a test is made at the end of Sequence Control State 3 to determine whether the list is currently full such that the ABL command cannot be successfully executed.

Considering now the ABL command specifically, it will be observed that the DABL signal is "one" when the Operation Code of the ABL command is in the I Register 23. FIGURE 37 shows logic for accomplishing the subtraction of one count from the "F" Field and the movement of the unmodified "F" Field to the I Register 23 bit positions 8–0. One input of a NAND gate G100 is enabled during the whole of Sequence Control State 3 by the SC3A signal such that the "one" output from the B Register 25 bit position 15 Flip-Flop is effectively inverted and applied to the A input of the "F" Full Adder 27. The B input of the "F" Full Adder 27 is held at the "zero" level by the DABL signal inverted by the NOT gate I186. The S and $\bar{S}$ outputs respectively from the "F" Full Adder 27 are applied to one input each of AND gates G102 and G103. The other input of each of these gates is activated by the shift signal ISFT. ISFT is "one" in coincidence with TCKA during the extended TT4E time of Sequence Control State 3 for all List commands until the Delay Time Counter complete condition is attained. Since the Delay Time Counter will have been preset to $17_8$ as explained above, there will be a string of nine ISFT pulses as shown in the timing diagrams FIGURES 32, 33, 34, and 35 before the TP13 signal becomes "one." The AND gates G103–G118 also each have one input activated by the ISFT signal to permit right shifting of the B Register 25 bit positions 23–15. The C and $\bar{C}$ outputs from "F" Full Adder 27 have no effect on the "F" Carry Flip-Flop 27A because the AND gates G201 and G203 are not enabled. The net result of forcing the B input of the "F" Full Adder 27 while circulating the whole "F" Field of the List Control Word through the A input is a subtraction of one from the "F" Field which will have returned to its original position in the B Register 25 after the ninth ISFT pulse.

The subtraction of one count by this serial "forcing" method is well known in the art, and can be demonstrated by a brief example of binary arithmetic. Assume an original count of nine in a four binary digit example.

Original count=1001=9
Force Count =1111
Result (1) $\overline{1000}$=8

Since there are only four places in this example, the carry is lost, and the desired result is obtained.

The number of bits which are to be shifted from the "F" Field of the List Control Word in the B Register 25 to the I Register 23 bit positions 8–0 is determined by the length of the list as reflected in the count to which the J Counter 30 has been set; i.e., the "ones" complement of the "L" Field. This operation is performed in synchronism with the decrementation of the "F" Field. Referring again to FIGURE 37, it will be observed that the "zero" output from the B Register 25 bit position 15 flip-flop is connected directly to the A input of the "I" Full Adder 28. The S and $\bar{S}$ outputs from the "I" Full Adder 28 are connected to one input of AND gates G122 and G121, respectively, and the other input of each of these gates is connected to the output from another AND gate G119. One input of the AND gate G119 is activated by the ISFT signal and the other is enabled by the $\overline{\textbf{J037}}$ signal which remains "one" until the J Counter 30 has been incremented successively to a count of $37_8$. As shown in FIGURE 36, the J Counter 30 is incremented by the JINC signal which is "one" in synchronism with ISFT until the $37_8$ count is attained. Thus, from one to nine JINC pulses will be generated depending upon the count to which the J Counter 30 was preset. AND gate G120 also has one input leg activated by the ISFT signal, but its other input is enabled only when the J Counter 30 reaches a count of $37_8$; i.e., when the signal J037 becomes "one."

The output signals from the AND gates G120 and G121 are inputs to an OR gate G123. The output signal from OR gate G123 is applied to the clear input of the I Register 23 bit position 8 flip-flop. The output signal from the AND gate G122 is applied to the set input of the same flip-flop. One input of each of the AND gates G124–G139 is activated by the ISFT signal to permit right shifting of this portion of the I Register 23, so long as the J Counter 30 has not reached a count of $37_8$, the AND gate G119 will be enabled with each ISFT pulse to enable one input of each of AND gates G121 and G122. One or the other of these gates will be fully enabled by each ISFT pulse according to the instantaneous state of the S and $\bar{S}$ outputs from the "I" Full Adder 28. Thus, if AND gate G122 is enabled, the I Register 23 bit position 8 flip-flop will be set at the trailing edge of the ISFT pulse. If, on the other hand, AND gate G121 is enabled, the OR gate G123 will also be enabled to clear the I Register 23 bit position 8 flip-flop at the trailing edge of the ISFT pulse. When the J Counter 30 reaches a count of $37_8$, the number of binary digits required to specify the relative address of the Enterable Beginning Item in the list will have been shifted out of the B Register 25 bit position 15 flip-flop, and further shifting through gates G121 and G122 will not take place because the AND gate G119 will now be disabled. However, the AND gate G120 will now be enabled with each ISFT pulse because the J037 signal will now be "one." The OR gate G123 will therefore be enabled to shift a "zero" into the I Register 23 bit position 8 flip-flop with each ISFT pulse. In this manner, only that part of the "F" Field of the List Control Word which is appropriate to specify relatively the Enterable Beginning Item of a circular list will be shifted into the I Register 23 and properly positioned.

The "N" Field of the List Control Word is held in B Register 25 bit positions 14–6 both before and after modification of the List Control Word. Referring now to FIGURE 38, it will be observed that at the beginning of Sequence Control State 3, the "N" Carry Flip-Flop 29A is in the cleared state because the SC1A signal was previously applied to its clear input through the OR gate G140.

However, the DABL signal enables the OR gate G210, and during TCT3 time, AND gate G141 will be enabled. A "one" output signal from AND gate G141 will enable OR gate G142 which drives the set input of the "N" Carry Flip-Flop 29A. Therefore, the "N" Carry Flip-Flop 29A is set before any addition takes place within the "N" Full Adder 29, and the P input to the "N" Full Adder 29 is enabled before the first ISFT pulse arises since it is driven by the "zero" output from the "N" Carry Flip-Flop 29A.

The input of a NAND gate G143 is enabled during the whole of Sequence Control State 3 by the SC3A signal, and its other input is connected to the "one" output from the B Register 25 bit position 6 flip-flop. When the ISFT pulse train is generated, circular shifting of the "N" Field of the List Control Word takes place through the "N" Full Adder 29 in much the manner described for the decrementation of the "F" Field. The ISFT pulses are applied to one input of each of the AND gates G144–G161 to permit the serial right shifting of the "N" Field portion of the B Register 25. The C and $\overline{C}$ outputs from the "N" Full Adder 29 are connected to one input respectively of AND gates G162 and G163. The other input of each of these gates is driven by the ISFT signal. The output from AND gate G162 is utilized as an input to the OR gate G142 which, as noted above, drives the set side of the "N" Carry Flip-Flop 29A. In a like manner, the output from AND gate G163 is an input to the OR gate G140 which drives the clear side of the "N" Flip-Flop 29A. With this arrangement, normal carry propagation is achieved during the serial addition because the "zero" output from the "N" Carry Flip-Flop 29A is connected directly to the P Input of the "N" Full Adder 29 to enable or disable that input for the next serial addition depending upon whether or not a carry resulted from a just-completed serial addition.

A test must be made in conjunction with the "N" Field incrementation to determine whether the list is full as specified by the modified "N" Field. For this purpose, a List Complete Flip-Flop FIXLCP is provided as shown in FIGURE 38. At TCT3 time of Sequence Control State 3, an AND gate G164 is enabled to preset the List Complete Flip-Flop FIXLCP. Another AND gate, G165, which has its output connected to the clear input of the List Complete Flip-Flop, has as input signals $\overline{\text{J037}}$, ISFT, and the S output signal from the "N" Full Adder 29. With this arrangement G165 will be enabled in synchronism with the ISFT pulse whenever the S output from the "N" Full Adder 29 is "one" and the J Counter 30 has not reached a count of $37_8$. If this condition occurs for any one of the nine ISFT pulses, G165 will be enabled to clear the List Complete Flip-Flop FIXLCP. That is, if a "one" is shifted from the "N" Full Adder S output into the B Register bit position 14 Flip-Flop during the modification to the "N" Field, G165 will be enabled to clear the List Complete Flip-Flop if the signal $\overline{\text{J037}}$ is "one." If the list does become full, all the significant bits of the "N" Field will be "zero" since they must all have been "one" before modification, and the next bit, which would be a "one" to represent the resulting carry, is not propagated because only the significant bits are considered due to the influence of the "L" Field as reflected in the $\overline{\text{J037}}$ signal. Under these conditions, the List Complete Flip-Flop FIXLCP remains set.

The "one" output from the List Complete Flip-Flop FIXLCP drives one input of an AND gate G184 which also has SC3A and TLPS signal inputs. The output from G184 is one of two inputs to another AND gate G166; the other input of AND gate G166 is already enabled by the output from an OR gate G183 which is enabled, inter alia, by the DABL signal. If the list has become full, AND gate G184 and hence AND gate G166 will be enabled at TLPS of Sequence Control State 3 of the ABL command to provide a set input signal to the B Register 25 bit position 5 flip-flop. The B Register bit position 4 flip-flop is always cleared at TLPS of Sequence Control State 3 of the ABL command by the enabling of an AND gate G167, which also has one input enabled by the output from OR gate G183, because the list can never be empty after the completion, successful or unsuccessful, of an ABL command.

A test must be made at the end of Sequence Control State 3 during the execution of an ABL command to determine whether the list is currently full, as indicated by bit 5 of the List Control Word being set before its modification. Referring again to FIGURE 38, it will be observed that when the DABL signal is "one" to enable the OR gate G183, and AND gate G174 will be enabled during the whole of Sequence Control State 3 if, and only if, the B Register 25 bit position 5 flip-flop is set. This last condition is tested by providing the "one" output signal from the B Register 25 bit position 5 flip-flop as one of the inputs to an AND gate G174. If the B Register bit position 5 flip-flop is set, the output signal from AND gate G174 will be "one" and this signal will enable an OR gate G175. The output signal from OR gate G175 is applied to one input of an AND gate G176 which has TLPS as its other input signal. Therefore, G176 will be enabled at TLPS of Sequence Control State 3 for the ABL command if the B Register 25 bit position 5 flip-flop is set. At the trailing edge of TLPS, the Sequence Control State 1 Flip-Flop, FISC01, will be set by the output signal from OR gate G177 which is enabled by inter alia, the output signal from AND gate G176. The other input to OR gate G177, unlabelled in FIGURE 38, represents the many conditions which cause Sequence Control State 1 to be entered periodically during the execution of various commands of a running program.

It will be remembered that if Sequence Control State 1 is entered following Sequence Control State 3 of an ABL command, the P Register 24 will contain the first sequential Memory storage address after that in which the ABL command being executed is stored because it was incremented during Sequence Control State 1. Therefore, program control will be transferred to the command stored in that first sequential storage location, and no storage of information will take place nor will the modified List Control Word be stored.

It may be observed that if AND gate G178 should be enabled because the B Register 25 bit position 4 flip-flop is set, OR gate G175, AND gate G176, and OR gate G177 will also be enabled at TLPS. This contingency will be discussed below with respect to a list empty test. On the other hand, if neither B Register 25 bit positions 5 or 4 flip-flops are set, NOR gate G179 will be enabled since the AND gates G174 and G178 must both be disabled. Therefore, AND gate G180, rather than AND gate G176, will be enabled at TLPS, and the output signal from AND gate G180 will enable OR gate G181. At the trailing edge of TLPS, the Sequence Control State 4 Flip-Flop will be set to permit full execution of the ABL command. The other input to OR gate G181, unlabelled in FIGURE 38, represents the many conditions which cause Sequence Control State 4 to be entered periodically during the execution of various commands of a running program.

The operations carried out during Sequence Control States 4 and 5 of a fully executed ABL command may best be understood with reefrence to the ABL timing diagram, FIGURE 32, and FIGURES 39 and 40 which are block diagrams of the information movement occurring among the various registers during Sequence Control Stated 4 and 5 respectively.

The MAMH signal is "one" during the whole of Sequence Control State 4 to gate the contents of the H Register 26 to the Memory Address Register 32. The modified List Control Word temporarily stored in the B Register 25 is gated to the Memory Data Register 33 by the DBDR Signal and is stored into Memory storage location Z which is the address transferred from the H Register 26 to the Memory Address Register 32. The P Register 24 is incremented by a second count of one in the same manner as occurred during Sequence Control State 1 and described in the discussion of that Sequence Control State. During TCTS time of Sequence Control State 4, the contents of the I Register 23 bit positions 8–0, the contents of the H Register 26 (Z), and a count of one are simultaneously gated to the PAU 20 by the UIAU, UHAU, and UENC signals respectively. The sum which then appears as output signals from the PAU 20 is the actual address of the Memory storage location into which the information word being held in the A register 21 is to be stored. This address is gated from the PAU 20 to the I Register 23 bit positions A, B, 13–0 in synchronism with TLPS of Sequence Control State 4 by the IAUI signal.

During Sequence Control State 5 of a completely executed ABL command, the information word in the A Register 21 is gated to the PAU 20 by the UAAU signal, from the PAU 20 to the B Register 25 by the BAUB signal, and subsequently from the B register 25 to the Memory Data Register 33 by the DBDR signal. During the whole of Sequence Control State 5, the MAMI signal is "one" to gate the contents of the I Register 23 bit positions A, B, 13–0 to the Memory Address Register 32. The information word is therefore stored into the Memory storage location specified by the address in the I Register 23 which was formed during Sequence Control States 3 and 4. At the trailing edge of TLPS of Sequence Control State 5, Sequence Control State 1 is reentered to fetch the next command from the Memory storage locations specified by the contents of the P Register 24 which will hold the second sequential address from that in which the ABL command is stored. Considering now the AEL command, signal DAEL is "one" when the AEL operation code is decoded from the I Register 23 bit positions 23–18. Referring to FIGURE 37, during Sequence Control State 3 of the execution of an AEL command, the "F" Field of the List Control Word is circulated through the NAND gate G100 and the "F" Full Adder 27 by the ISFT pulses in the same manner as described for Sequence Control State 3 of the execution of an ABL command. In the case of the AEL command however, the B input to the "F" Full Adder is not forced since the DABL signal is not "one." As a result, the "F" Field is not modified during Sequence Control State 3 of the execution of an AEL command.

The binary number which is present in I Register 23 bit positions 8–0 at the end of Sequence Control State 3 for the AEL command must be equal to the sum of the "F" and "N" Fields before their modification plus an additional count of one to achieve storage into the Enterable Ending Item storage location. Referring again to FIGURE 37, it will be seen that OR gate G168 and AND gates G206 and G170 are enabled by the DAEL, SC3A, TCT3 combination of signals to preset the "I" Carry Flip-Flop 28A. The ISFT pulses are then utilized to shift the "F" Field of the List Control Word in B Register 25 bit positions 23–15 and the "N" Field of the List Control Word in B register 25 bit positions 14–6 through the "I" Full Adder 28. The ISFT pulses are also utilized to gate the S and $\overline{S}$ outputs into position in the I Register 23 bit positions 8–0 as described for the ABL command. The AND gates G144–G161 permit serial right shifting of the "N" Field portion of the B Register 25 when the ISFT pulse train arises. The AND gate G185 is enabled whenever the AEL command is decoded to permit shifting the B Register 25 bit position 6 flip-flop information through the NAND gate G173 to the B input of the "I" Full Adder 28. The AND gates G169 and G171 and the OR gates G170 and G172 cooperate to gate the C and $\overline{C}$ outputs from the "I" Full Adder 28 to the "I" Carry Flip-Flop 28A in synchronism with the ISFT pulses to achieve normal carry propagation.

If the list becomes full with the execution of an AEL command, the B Register 25 bit position 5 flip-flop is set through essentially the same sequence of logical operations as for the ABL command, differing only in that the OR gate G183 is enabled by the DAEL signal rather than by the DABL signal. Similarly, the Sequence Control State decision which occurs at the end of Sequence Control State 3 is identical for the ABL and AEL commands except for the enabling signal to the OR gate G183. The operations carried out during Sequence Control States 4 and 5 are identical for the ABL and AEL commands.

Considering now the RBL command, the DRBL signal is "one" when the RBL operation code is decoded from the I Register 23 bit positions 23–18. As previously mentioned, the modifications to the List Control Word which must take place during the execution of an RBL command are: (a) an addition of one to the "F" Field, (b) a subtraction of one from the "N" Field, and (c) the setting of bit 4 of the List Control Word if the list becomes empty with the execution of the instant RBL command. A count of $F+1$ is also shifted to the I Register 23 bit positions 8–0 in preparation for determining the exact Memory storage location from which an information word is to be extracted.

The logic for accomplishing the addition of one to the "F" Field and the movement of the unmodified "F" Field plus a count of one to the I Register 23 bit positions 8–0 is shown in FIGURE 37. As with the ABL and AEL commands, one input of the NAND gate G100 is enabled during the whole of Sequence Control State 3 by the SC3A signal such that the "one" output from the B Register 25 bit position 15 flip-flop is effectively inverted and applied to the A input of the "F" Full Adder 27. In addition, the SC3A signal enables one input of another NAND gate G200. The other input of G200 is driven from the "one" output from the "F" Carry Flip-Flop 27A, and the output from G200 is connected to the P input to the "F" Full Adder 27. It will be observed that at the beginning of Sequence Control State 3 during the execution of an RBL command, the "F" Carry Flip-Flop 27A is in the cleared state because the SC1A signal was was previously applied to the clear input through an OR gate B204. However, the DRBL signal enables the OR gate G210, and its output is applied as one input to an AND gate G205 which becomes fully enabled at TCT3 time of Sequence Control State 3. The output signal from G205 is one input to another OR gate G202 which drives the set input of the "F" Carry Flip-Flop 27A. Therefore, the "F" Carry Flip-Flop 27A is set before any addition takes place within the "F" Full Adder 27, and the P input into the "F" Full Adder 27 is enabled before the first ISFT pulse is generated. Hence, when the train of nine ISFT pulses is generated, the "F" Field of the List Control Word is circulated through the "F" Full Adder 27 and returned to its original position in the B Register 25 after being incremented by one because of the presetting of the "F" Carry Flip-Flop 27A.

The number of bits which are to be shifted from the "F" Field in the B Register 25 to the I Register 23 bit positions 8–0 is determined in the same manner as previously described for the ABL command. However, the actual count to be shifted into the I Register 23, in the case of an RBL command, must be the "F" Field plus an additional count of one. This addition of one count is achieved by presetting the "I" Carry Flip-Flop 28A. As shown in FIGURE 37, the DRBL signal enables an OR gate G168, and the output signal from G168 is applied to one input of an AND gate G206 having as its other inputs the SC3A and TCT3 signals. When AND gate G206 is enabled, its output signal enables an OR gate G170 which drives the set input of the "I" Carry Flip-Flop 28A. The "zero" output from the "I" Carry Flip-Flop 28A is connected directly to the "I" Full Adder 28 P input. Therefore, the P input to the "I" Full Adder 28 is enabled before the train of ISFT pulses arises. The ISFT train shifts the "F" Field through the "I" Full Adder 28 and into the I Register 23 bit positions 8–0 in the same manner as previously described for the ABL command. The net result in the I Register 23 bit positions 8–0 is the sum of the "F" Field plus a count of one resulting from the presetting of the "I" Carry Flip-Flop 28A.

The "N" Field must be decremented by a count of one during the execution of an RBL command. This is achieved by the logic shown in FIGURE 38. One input to the NAND gate G143 is enabled by the SC3A signal, and its other input is connected directly to the "one" output from the B Register 25 bit position 6 flip-flop, the signal from which is thereby effectively inverted and applied to the A input of the "N" Full Adder 29. The B input of the "N" Full Adder 29 is forced by the DRBL signal which is effectively inverted through the NOR gate G207. The "N" Carry Flip-Flop 29, previously cleared by the trailing edge of the SC1A signal applied through the OR gate G140, is not preset and so operates to provide only normal carry propagation. The net result of forcing the B input of the "N" Full Adder 29 while circulating the "N" Field through the A input when the train of ISFT pulses is generated is a subtraction of one from the "N" Field which will have returned to its original position in the B Register 25 after the ninth ISFT pulse.

The List Complete Flip-Flop, F1XLCP, monitors the S output from the "N" Full Adder 29 to determine whether the list becomes empty after execution of the RBL command, as indicated by the modified "N" Field. As with the ABL and AEL commands, the List Complete Flip-Flop is preset at TCT3 time of Sequence Control State 3 by the enabling of the AND gate G164. The AND gate G165, which drives the clear input to F1XLCP, will be enabled in synchronism with the ISFT pulse whenever the S output from the "N" Full Adder 29 is "one" and the J Counter 30 has not reached a count of $37_8$. If this condition occurs for any one of the nine ISFT pulses, G165 will be enabled to clear the List Complete Flip-Flop F1XLCP. However, if the list does become empty, all of the significant bits of the "N" Field, as specified by the "L" Field, will be "zero," and the List Complete Flip-Flop F1XLCP will not be cleared.

The "one" output from the List Complete Flip-Flop drives one input of the AND gate G184 which also has as signal inputs SC3A and TLPS. If the list has become empty, G184 will be enabled at TLPS of Sequence Control State 3 of the RBL command to enable one input of the AND gate G208. The other input to AND gate G208 will already be enabled by the output from an OR gate G182 which has the DREL signal as one input. Therefore, the B Register 25 bit position 4 flip-flop will be set at the trailing edge of TLPS of Sequence Control State 3 of the RBL command if the List Complete Flip-Flop F1XLCP has remained set. The B Register 25 bit position 5 flip-flop is always cleared at TLPS of Sequence Control State 3 of an RBL command by the enabling of AND gates G211 and G209 because a list can never be full after the completion, successful or unsuccessful, of an RBL command.

Considering now the REL command, the signal DREL is "one" whenever the REL operation code is in the I Register bit position 23–18. Referring again to FIGURE 37, it will be noted that the "F" Field is merely circulated through the NAND gate G100 and the "F" Full Adder 27 by the ISFT pulses during Sequence Control State 3 of the REL command. The "F" Carry Flip-Flop 27A, previously cleared by the trailing edge of the SC1A pulse applied through the OR gate G204, is not preset and the B input to the "F" Full Adder is not enabled. However, the binary number which appears in the I Register 23 bit positions 8–0 at the end of Sequence Control State 3 of the REL command must be equal to the sum of the "F" and "N" Fields before modification to the List Control Word. This summation is achieved by shifting the "F" Field to the A input and the "N" Field to the B input of the "I" Full Adder 28 utilizing the ISFT pulses. The "I" Carry Flip-Flop 28A, previously cleared by the trailing edge of the SC1A pulse applied through the OR gate G172, is not preset. This operation proceeds in a manner similar to that described for the AEL command above, but differs in that the OR gate G185 is enabled by the DREL signal rather than by the DAEL signal.

At the end of Sequence Control State 3 for either the RBL or REL commands, a test must be made to determine whether the list is currently empty as specified by the List Control Word before modification. As shown in FIGURE 38, one input to the AND gate G178 is the output signal from the OR gate G182 which will be enabled by the DRBL or DREL signal. The other inputs to AND gate G178 are the SC3A signal and the "one" output from the B Register 25 bit position 4 flip-flop. Therefore, the AND gate G178 will be enabled during the whole of Sequence Control State 3 of the RBL or REL command if, and only if, the B Register 25 bit position 4 flip-flop is set. If this condition is present, the OR gate G175 is also enabled by the output signal from G178, and the G175 output signal enables one input of the AND gate G176. The other input of G176 will become enabled at TLPS of Sequence Control State 3 for the RBL or REL command, and, at the trailing edge of TLPS, the Sequence Control State 1 Flip-Flop will be set by the output signal from the OR gate G177 which is driven by G176. It will be observed that, at this instant, the P Register 24 will contain the first sequential Memory storage location address from that in which the command being executed is stored. Therefore, program control will be transferred to the command stored in that location, and no storage of information will take place nor will the modified List Control Word be stored. On the other hand, if neither B Register 25 bit position 5 or 4 flip-flops are set, the NOR gate G179 will be enabled because the AND gates G174 and G178 must both be disabled. With the latter condition, the AND gate G180, rather than G176, will be enabled at TLPS to enable the OR gate G181. The output signal from OR gate G181 sets the Sequence Control State 4 Flip-Flop so that the RBL or REL command can be fully executed.

The functions carried out during Sequence Control State 4 of the RBL and REL List commands are identical, and that Sequence Control State for these commands proceeds as described above for the ABL and AEL commands.

The functions carried out during Sequence Control State 5 of a fully executed RBL or REL command are identical and may best be understood with reference to their respective timing diagrams, FIGURES 34 and 35, and to FIGURE 41 which is a block diagram of the information movement occurring among the various registers during Sequence Control State 5. During the whole of Sequence Control State 5, the MAMI signal is "one" and gates the contents of the I Register 23 bit positions A, B, 13–0 to the Memory Address Register 32. The operand address in the I Register 23 at this time is that formed during Sequence Control State 3 and 4; therefore, the information word which appears in the Memory Data Register 33 is the requested Removable Beginning or Ending Item which is to be removed. At TCT2 time, this information word is gated to the B Register 25 by the BDOB signal and from the B Register 25 to the PAU 20 by the UBUA and UBLA signals which are "one" during the whole of Sequence Control State 5. At TLPS, the AAUA signal gates the information word represented by the output signals from the PAU 20 to the A Register 21, and Sequence Control State 1 is entered to fetch the command word stored in the second sequential core cell from that in which the RBL or REL command just executed is stored.

The DIDL and DODL signals, shown as inputs to various gates in FIGURES 37 and 38, do not become "one"

at any time during the execution of the List commands.

What is claimed is:

1. An information processing system comprising memory means including a plurality of storage locations for storing a corresponding plurality of information words, a first register for temporarily storing the command word of an instruction to be executed by said information processing system, the command word including an operand address portion and an operation code portion indicative of desired information transfer, addressing means responsive to the operand address portion of the command word stored in said first register for providing the identification of a first storage location, a second register for temporarily storing the operand address portion of the command word stored in said first register, a third register in communication with said memory means, means responsive to the identification provided by said addressing means for transferring the word stored in the first storage location to said third register, means responsive to the operation code portion of said command word for providing a command signal, testing means for testing a first field of the word temporarily stored in said third register for sensing a storage location condition, means included in said testing means responsive to the detection of the storage location condition for generating a signal, combining means for combining, in accordance with said command signal, at least one additional field of the word temporarily stored in said third register with the operand address temporarily stored in said second register to provide the identification of a second storage location, a fourth register, and means responsive to said signal and to the identification provided by said combining means for transferring an information word between said fourth register and the second storage location.

2. An information processing system as recited in claim 1 including a fifth register for temporarily storing the memory address of the command word, means for incrementing the memory address temporarily stored in said fifth register by a first count of one, and means responsive to the generation of said signal for incrementing the memory address temporarily stored in said fifth register by a second count of one.

3. An information processing system comprising memory means including a plurality of storage locations for storing a corresponding plurality of information words, first, second, third and fourth registers, said fourth register providing for temporary storage of an information word, said first register storing the command word of an instruction to be executed by said information processing system, said command word specifying a transfer of an information word between said fourth register and said memory means, first means responsive to the command word in said first register for providing a predetermined signal, second means responsive to the predetermined signal for transferring the word stored in a first storage location to said third register, third means responsive to the predetermined signal for transferring the address of the first storage location to said second register, testing means for testing a first field of the word temporarily stored in said third register for sensing a storage location condition, means included in said testing means for generating a signal, combining means for combining, in accordance with said command word in said first register, at least one additional field of the word temporarily stored in said third register with the address temporarily stored in said second register to provide an identification of a second storage location, and means responsive to said signal and to the identification provided by said combining means for transferring an information word between said fourth register and the second storage location.

4. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring the word stored in the first storage location to said third register, testing means for testing first and second fields of the word temporarily stored in said third register for sensing first and second storage location conditions, means responsive to the detection of the first storage location condition for generating a first signal, means responsive to the detection of the second storage location condition for generating a second signal, means responsive to the generation of both said first and second signals for generating a third signal, combining means for combining a third field of the word temporarily stored in said third register with the operand address temporarily stored in said second register to provide the identification of a second storage location, a fourth register, and means responsive to said third signal and to the identification provided by said combining means for transferring an information word from said fourth register to the second storage location.

5. An information processing system as recited in claim 4 including a fifth register for temporarily storing the memory address of the command word, means for incrementing the memory address temporarily stored in said fifth register by a first count of one, and means responsive to the generation of said third signal for incrementing the memory address temporarily stored in said fifth register by a second count of one.

6. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring the word stored in the first storage location to said third register, testing means for testing first and second ter for sensing first and second storage location conditions, means responsive to the detection of the first storage location condition for generating a first signal, means responsive to the detection of the second storage location condition for generating a second signal, means responsive to the generation of both said first and second signals for generating a third signal, combining means for combining third and fourth fields of the word temporarily stored in said third register with the operand address temporarily stored in said second register to provide the identification of a second storage location, a fourth register, and means responsive to said third signal and to the identification provided by said combining means for transferring an information word from the second storage location to said fourth register.

7. An information processing system as recited in claim 6 including a fifth register for temporarily storing the memory address of the command word, means for incrementing the memory address temporarily stored in said fifth register by a first count of one, and means responsive to the generation of said third signal for incrementing the memory address temporarily stored in said fifth register by a second count of one.

8. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring the word stored in the first storage location to said third register, testing means for testing first and second fields of the word temporarily stored in said third register for sensing first and second storage location conditions, means responsive to the detection of the first storage location condition for generating a first signal, means responsive to the detection of the second storage location condition for generating a second signal, means responsive to the generation of both said first and second signals for generating a third signal, combining means for combining at least two additional fields of the word temporarily stored in said third register with the operand address temporarily stored in said second register to provide the identification of a second storage location, a fourth register, and means responsive to said third signal and to the identification provided by said combining means for transferring an information word from said fourth register to the second storage location.

9. An information processing system as recited in claim 8 including a fifth register for temporarily storing the memory address of the command word, means for incrementing the memory address temporarily stored in said fifth register by a first count of one, and means responsive to the generation of said third signal for incrementing the memory address temporarily stored in said fifth register by a second count of one.

10. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring the word stored in the first storage location to said third register, testing means for testing first and second fields of the word temporarily stored in said third register for sensing first and second storage location conditions, means responsive to the detection of the first storage location condition for generating a first signal, means responsive to the detection of the second storage location condition for generating a second signal, means responsive to the generation of both said first and second signals for generating a third signal, combining means for combining at least one additional field of the word temporarily stored in said third register with the operand address temporarily stored in said second register to provide the identification of a second storage location, a fourth register, and means responsive to said third signal and to the identification provided by said combining means for transferring an information word from the second storage location to said fourth register.

11. An information processing system as recited in claim 10 including a fifth register for temporarily storing the memory address of the command word, means for incrementing the memory address temporarily stored in said fifth register by a first count of one, and means responsive to the generation of said third signal for incrementing the memory address temporarily stored in said fifth register by a second count of one.

12. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsve to the identification provided by said addressing means for transferring a control word stored in the first storage location to said third register, said control word including "F," "N," "L" and "List Full" fields of which said "L" field indicates the predetermined plurality of storage locations, testing means for testing said "List Full" field of said control word temporarily stored in said third register for sensing a storage location non-availability condition, means responsive to the failure of said testing means to detect a list full condition for generating a signal, combining means for adding said "F" field of said control word temporarily stored in said third register to the operand address temporarily stored in said second register plus an additional count of one to provide the identification of a second storage location, a fourth register, means responsive to said signal and to the identification provided by said combining means for transferring an information word from said fourth register to the second storage location, a fifth register for temporarily storing the memory address of the command word, means for incrementing the memory address temporarily stored in said fifth register by a first count of one, and means responsive to the generation of said signal for incrementing the memory address temporarily stored in said fifth register by a second count of one.

13. An information processing system as recited in claim 12 including means for substracting a count of one from said "F" field and adding a count of one from said "N" field of said control word temporarily stored in said third register to develop a modified control word and further means responsive to said signal for storing said modified control word into the first storage location.

14. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring a control word stored in the first storage location to said third register, said control word including "F" "N" "L" and "List Full" fields of which said "L" field indicates the predetermined plurality of storage locations, testing means for testing the "List Full" field of said control word temporarily stored in said third register for sensing a storage location non-availability condition, means responsive to the failure of said testing means to detect a list full condition of generating a signal, combining mans for adding said "F" and said "N" field of said control word temporarily stored in said third register to the operand address temporarily stored in said second register plus an additional count of two to provide the identification of a second storage location, a fourth register, means responsive to said signal and to the identification provided by said combining means for transferring an information word from said fourth register to the second storage location, a fifth register for temporarily storing the memory address of the command word, means for incrementing the memory address temporarily stored in said fifth register by a first count of one, and means responsive to the generation of said signal for incrementing the memory address temporarily stored in said fifth register by a second count of one.

15. An information processing system as recited in claim 14 including means for adding a count of one to said "N" field of said control word temporarily stored in said third register to develop a modified control word and further means responsive to said signal for storing said modified control word into the first storage location.

16. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring a control word stored in the first storage location to said third register, said control word including "F," "N," "L" and "List Empty" fields of which said "L" field indicates the predetermined plurality of storage locations, testing means for testing said "List Empty" field of said control word temporarily stored in said third register for sensing a lack of meaningful stored information words in the plurality of storage locations, means responsive to the failure of said testing means to detect a list empty condition for generating a signal, combining means for adding said "F" field of said control word temporarily stored in said third register to the operand address temporarily stored in said second register plus an additional count of two to provide the identification of a second storage location, a fourth register, means responsive to said signal and to the identification provided by said combining means for transferring and information word from the second storage location to said fourth register, a fifth register for temporarily storing the memory address of the command word, means for incrementing the memory address temporarily stored in said fifth register by a first count of one, and means responsive to the generation of said signal for incrementing the memory address temporarily stored in said fifth register by a second count of one.

17. An information processing system as recited in claim 16 including means for adding a count of one to said "F" field and subtracting a count of one from said "N" field of said control word temporarily stored in said third register to develop a modified control word and further means responsive to said signal for storing said modified control word into the first storage location.

18. An information processing system comprising memory means including a plurality of storage locations for storing a corresponding plurality of information words, a first register for temporarily storing the command word of an instruction to be executed by said information processing system, addressing means responsive to an operand address portion of the command word stored in said first register for providing the identification of a first storage location, a second register for temporarily storing the operand address portion of the command word stored in said first register, a third register in communication with said memory means, means responsive to the identification provided by said addressing means for transferring a control word stored in the first storage location to a third register, said control word including "F," "N," "L" and "List Empty" fields of which said "L" field indicates the predetermined plurality of storage locations, testing means for testing said "List Empty" field of said control word temporarily stored in said third register for sensing a lack of meaningful stored information words in the plurality of storage locations, means responsive to the failure of said testing means to detect a list empty condition for generating a signal, combining means for adding said "F" field and said "N" field of said control word temporarily stored in said third register to the operand address temporarily stored in said second register plus an additional count of one to provide the identification of a second storage location, a fourth register, means responsive to said signal and to the identification provided by said combining means for transferring an information word from the second storage location to said fourth register, a fifth register for temporarily storing the memory address of the command word, means for incrementing the memory address temporarily stored in said fifth register by a first count of one, and means responsive to the generation of said signal for incrementing the memory address temporarily stored in said fifth register by a second count of one.

19. An information processing system as recited in claim 18 including means for subtracting a count of one from said "N" field of said control word temporarily stored in said third register to develop a modified control word and further means responsive to said signal for storing said modified control word into the first storage location.

20. An information processing system comprising memory means including a plurality of storage locations for storing a plurality of information words and a list control word, a first register for temporarily storing the command word of an instruction to be executed by said information processing system, the command word including an operand address portion and an operation code portion indicative of desired information transfer, addressing means responsive to the operand address portion of the command word stored in said first register for providing the identification of a first storage location containing said list control word, a second register for temporarily storing the operand address portion of the command word stored in said first register, a third register in communication with said memory means, means responsive to the identification provided by said addressing means for transferring said list control word stored in said first storage location to said third register, said list control word including a first field whose contents indicate the number of storage locations available for storing said information words, counting means responsive to said first field for generating a list length signal, means controlled by said list length signal for modifying a second field of said list control word temporarily stored in said third register in accordance with the contents of said first field, testing means for testing a third field of said list control word temporarily stored in said third register for sensing a storage location condition, means included in said testing means responsive to the detection of the storage location condition for generating a control signal, means responsive to the operation code portion of said command word for providing a command signal, combining means for combining, in accordance with said command signal, at least said modified second field with the operand address temporarily stored in said second register to provide the identification of a second storage location, a fourth register, and means responsive to said control signal and to the identification provided by said combining means for transferring an information word between said fourth register and the second storage location.

21. A information processing system as recited in claim 20, further including second means controlled by said list length signal for modifying a fourth field of said list control word temporarily stored in said third register in accordance with the contents of said first field, said combining means combining, in accordance with said command signal, said modified second and fourth fields with the operand address temporarily stored in said second register to provide the identification of a second storage location.

22. An information processing system as recited in claim 21, further including comparing means in said testing means which makes a comparison of said fourth field with said list length signal, said comparing means blocking said control signal upon the detection of a second storage location condition resulting from said comparison.

23. An information processing system as recited in claim 22, wherein said list length controlled means and said second list length controlled means further include a fifth register and means shifting into said fifth register the modified portions of said second and fourth fields temporarily stored in said third register.

24. An information processing system as recited in claim 23, including a sixth register for temporarily storing the memory address of the command word, means for incrementing the memory address temporarily stored in said sixth register by a first count of 1, and means responsive to the generation of said control signal for incrementing the memory address temporarily stored in said sixth register by a second count of 1.

25. An information processing system as recited in claim 12, further including a sixth register, and means for shifting the significant digits of said "F" field of said control word temporarily stored in said third register, as determined by the contents of said "L" field, to said sixth register, said combining means adding the significant digits of said "F" field temporarily stored in said sixth register to the operand address temporarily stored in said second register plus an additional count of one to provide the identification of a second storage location.

26. An information processing system as recited in claim 14, further including a sixth register, and means for shifting the significant digits of said "F" and "N" fields of said control word temporarily stored in said third register, in accordance with the contents of said "L" field, to said sixth register, said combining means adding said significant digits of said "F" and "N" fields temporarily stored in said sixth register to the operand address temporarily stored in said second register plus an additional count of two to provide the identification of a second storage location.

27. An information processing system as recited in claim 16, further including a sixth register, and means for shifting the significant digits of said "F" field of said control word temporarily stored in said third register, as determined by the contents of said "L" field, to said sixth register, said combining means adding said significant digits of said "F" field temporarily stored in said sixth register to the operand address temporarily stored in said second register plus an additional count of two to provide the identification of a second storage location.

28. An information processing system as recited in claim 18, further including a sixth register, and means for shifting the significant digits of said "F" and "N" fields of said control word temporarily stored in said third register, as determined by the contents of said "L" field, to said sixth register, said combining means adding said significant digits of said "F" and "N" fields temporarily stored in said sixth register to the operand address temporarily stored in said second register plus an additional count of one to provide the identification of a second storage location.

References Cited

UNITED STATES PATENTS

| | | | |
|---|---|---|---|
| 3,290,658 | 12/1966 | Callahan et al. | 340—172.5 |
| 3,202,971 | 8/1965 | Blaauw | 340—172.5 |
| 3,226,691 | 12/1965 | Hazard | 340—172.5 |
| 3,202,970 | 8/1965 | Rice | 340—172.5 |
| 3,161,763 | 12/1964 | Glaser | 340—172.5 |
| 3,116,410 | 12/1963 | Manna et al. | 340—172.5 |
| 3,061,192 | 10/1962 | Terzian | 340—172.5 |
| 2,907,524 | 10/1959 | Cali | 340—172.5 |

GARETH D. SHAW, Primary Examiner